(12) United States Patent
Gough et al.

(10) Patent No.: US 9,473,441 B2
(45) Date of Patent: Oct. 18, 2016

(54) E-MAIL WITH DISCRETIONARY FUNCTIONALITY

(75) Inventors: Michael L. Gough, Ben Lomond, CA (US); James J. Gough, Ben Lomond, CA (US); Paul L. Hickman, Los Altos Hills, CA (US)

(73) Assignee: GOOGLE INC., Mountain View, CA (US)

( * ) Notice: Subject to any disclaimer, the term of this patent is extended or adjusted under 35 U.S.C. 154(b) by 1748 days.

(21) Appl. No.: 12/142,764

(22) Filed: Jun. 19, 2008

(65) Prior Publication Data

US 2015/0196838 A1 Jul. 16, 2015

Related U.S. Application Data

(60) Division of application No. 09/997,322, filed on Nov. 27, 2001, now Pat. No. 8,595,261, which is a continuation of application No. 09/401,026, filed on Sep. 21, 1999, now Pat. No. 6,360,221.

(51) Int. Cl.
*G06F 15/16* (2006.01)
*H04L 12/58* (2006.01)
*G06Q 30/02* (2012.01)
*G06F 17/22* (2006.01)
(Continued)

(52) U.S. Cl.
CPC ............... *H04L 51/22* (2013.01); *A63F 3/02* (2013.01); *G06F 17/2247* (2013.01); *G06Q 30/0273* (2013.01); *G06Q 30/0277* (2013.01); *H04L 51/046* (2013.01); *H04L 51/08* (2013.01); *H04L 51/18* (2013.01); *H04L 67/42* (2013.01); *G06Q 10/107* (2013.01); *H04L 41/026* (2013.01)

(58) Field of Classification Search
CPC ..... H04L 41/026; H04L 51/22; H04L 51/18; H04L 51/046; H04L 51/08; H04L 67/42; G06F 17/2247; A63F 3/02; G06Q 10/107; G06Q 30/0273; G06Q 30/0277
USPC ........................................................ 709/206
See application file for complete search history.

(56) References Cited

U.S. PATENT DOCUMENTS 5,283,856 A 2/1994 Gross
5,297,143 A 3/1994 Fridrich et al.
(Continued)

FOREIGN PATENT DOCUMENTS

EP 0 631 419 B1 3/1996
EP 0 340 039 B1 10/1996
(Continued)

OTHER PUBLICATIONS

Unknown Author; Xboard; Apr. 1, 1996; Free Software Foundation; 40 Pages + 3 pages header.*
(Continued)

*Primary Examiner* — Kevin Bates
*Assistant Examiner* — Anthony Fabbri
(74) *Attorney, Agent, or Firm* — Morgan, Lewis & Bockius LLP

(57) ABSTRACT

An embodiment, by way of non-limiting example, comprises an e-mail method including creating an e-mail having discretionary functionality and sending the e-mail. Another embodiment, by way of non-limiting example, comprises an e-mail server including a computer configured to create an e-mail having discretionary functionality and to send the e-mail.

6 Claims, 11 Drawing Sheets

(51) Int. Cl.
  *H04L 29/06* (2006.01)
  *A63F 3/02* (2006.01)
  *G06Q 10/10* (2012.01)
  *H04L 12/24* (2006.01)

(56) References Cited

U.S. PATENT DOCUMENTS

| | | | |
|---|---|---|---|
| 5,396,588 A | 3/1995 | Froessl | |
| 5,428,784 A | 6/1995 | Cahill, Jr. | |
| 5,513,126 A | 4/1996 | Harkins et al. | |
| 5,548,745 A | 8/1996 | Egan et al. | |
| 5,557,320 A * | 9/1996 | Krebs | H04N 21/4331 348/E7.075 |
| 5,572,648 A | 11/1996 | Bibayan | |
| 5,619,648 A | 4/1997 | Canale et al. | |
| 5,634,005 A | 5/1997 | Matsuo | |
| 5,659,729 A | 8/1997 | Nielsen | |
| 5,694,616 A | 12/1997 | Johnson et al. | |
| 5,724,521 A | 3/1998 | Dedrick | |
| 5,740,252 A | 4/1998 | Minor et al. | |
| 5,740,374 A | 4/1998 | Raffali-Schreinemachers | |
| 5,754,939 A | 5/1998 | Herz et al. | |
| 5,774,170 A | 6/1998 | Hite et al. | |
| 5,774,534 A | 6/1998 | Mayer | |
| 5,781,901 A | 7/1998 | Kuzma | |
| 5,790,789 A | 8/1998 | Suarez | |
| 5,790,793 A | 8/1998 | Higley | |
| 5,793,972 A * | 8/1998 | Shane | G06F 17/30893 705/14.4 |
| 5,799,267 A | 8/1998 | Siegel | |
| 5,806,043 A | 9/1998 | Toader | |
| 5,809,242 A | 9/1998 | Shaw et al. | |
| 5,815,830 A | 9/1998 | Anthony | |
| 5,818,447 A | 10/1998 | Wolf et al. | |
| 5,825,865 A | 10/1998 | Oberlander et al. | |
| 5,826,023 A | 10/1998 | Hall et al. | |
| 5,826,062 A | 10/1998 | Fake, Jr. et al. | |
| 5,832,208 A | 11/1998 | Chen et al. | |
| 5,832,502 A | 11/1998 | Durham et al. | |
| 5,838,790 A | 11/1998 | McAuliffe et al. | |
| 5,848,397 A | 12/1998 | Marsh | |
| 5,856,825 A | 1/1999 | Yumoto et al. | |
| 5,859,636 A | 1/1999 | Pandit | |
| 5,862,325 A * | 1/1999 | Reed | H04L 29/06 704/270.1 |
| 5,867,494 A | 2/1999 | Krishnaswamy et al. | |
| 5,870,549 A | 2/1999 | Bobo, II | |
| 5,884,246 A | 3/1999 | Boucher et al. | |
| 5,897,635 A | 4/1999 | Torres et al. | |
| 5,903,269 A | 5/1999 | Poreh et al. | |
| 5,909,545 A | 6/1999 | Frese, II et al. | |
| 5,918,014 A | 6/1999 | Robinson | |
| 5,937,160 A | 8/1999 | Davis et al. | |
| 5,937,162 A | 8/1999 | Funk et al. | |
| 5,937,392 A | 8/1999 | Alberts | |
| 5,946,386 A | 8/1999 | Rogers et al. | |
| 5,948,061 A | 9/1999 | Merriman et al. | |
| 5,950,215 A | 9/1999 | Tabuchi | |
| 5,956,486 A | 9/1999 | Hickman et al. | |
| 5,983,190 A | 11/1999 | Trower, II et al. | |
| 5,983,200 A | 11/1999 | Slotznick | |
| 6,002,393 A | 12/1999 | Hite et al. | |
| 6,009,410 A | 12/1999 | LeMole et al. | |
| 6,009,462 A | 12/1999 | Birrell et al. | |
| 6,011,537 A | 1/2000 | Slotznick | |
| 6,014,134 A * | 1/2000 | Bell et al. | 715/705 |
| 6,014,502 A | 1/2000 | Moraes | |
| 6,014,688 A * | 1/2000 | Venkatraman | G06Q 10/107 709/206 |
| 6,014,689 A * | 1/2000 | Budge | H04L 12/58 709/206 |
| 6,014,698 A | 1/2000 | Griffiths | |
| 6,016,520 A | 1/2000 | Facq et al. | |
| 6,021,427 A | 2/2000 | Spagna et al. | |
| 6,023,729 A | 2/2000 | Samuel et al. | |
| 6,026,437 A | 2/2000 | Muschett et al. | |
| 6,035,104 A | 3/2000 | Zahariev | |
| 6,047,310 A | 4/2000 | Kamakura et al. | |
| 6,049,778 A | 4/2000 | Walker et al. | |
| 6,052,709 A | 4/2000 | Paul | |
| 6,055,510 A | 4/2000 | Henrick et al. | |
| 6,061,698 A * | 5/2000 | Chadha et al. | 715/207 |
| 6,061,719 A | 5/2000 | Bendinelli et al. | |
| 6,064,990 A | 5/2000 | Goldsmith | |
| 6,065,001 A | 5/2000 | Ohkubo et al. | |
| 6,067,570 A | 5/2000 | Kreynin et al. | |
| 6,073,167 A | 6/2000 | Poulton et al. | |
| 6,078,320 A | 6/2000 | Dove et al. | |
| 6,092,101 A | 7/2000 | Birrell et al. | |
| 6,092,104 A | 7/2000 | Kelly | |
| 6,101,532 A * | 8/2000 | Horibe et al. | 709/206 |
| 6,108,709 A | 8/2000 | Shinomura et al. | |
| 6,134,243 A | 10/2000 | Jones et al. | |
| 6,134,532 A | 10/2000 | Lazarus et al. | |
| 6,138,149 A | 10/2000 | Ohmura | |
| 6,141,684 A | 10/2000 | McDonald et al. | |
| 6,144,987 A | 11/2000 | Niemi | |
| 6,154,764 A | 11/2000 | Nitta et al. | |
| 6,157,721 A | 12/2000 | Shear et al. | |
| 6,161,130 A | 12/2000 | Horvitz et al. | |
| 6,167,251 A | 12/2000 | Segal et al. | |
| 6,167,395 A | 12/2000 | Beck et al. | |
| 6,167,434 A | 12/2000 | Pang | |
| 6,167,448 A * | 12/2000 | Hemphill | G06F 9/542 709/217 |
| 6,173,337 B1 | 1/2001 | Akhond et al. | |
| 6,175,857 B1 * | 1/2001 | Hachiya | G06Q 10/107 707/999.01 |
| 6,185,605 B1 | 2/2001 | Kowaguchi | |
| 6,199,103 B1 | 3/2001 | Sakaguchi et al. | |
| 6,199,106 B1 | 3/2001 | Shaw et al. | |
| 6,205,432 B1 | 3/2001 | Gabbard et al. | |
| 6,208,998 B1 | 3/2001 | Marcus | |
| 6,212,554 B1 | 4/2001 | Roskowski | |
| 6,219,054 B1 | 4/2001 | Komoda et al. | |
| 6,223,213 B1 * | 4/2001 | Cleron | G06Q 10/107 709/206 |
| 6,225,993 B1 | 5/2001 | Lindblad et al. | |
| 6,233,317 B1 | 5/2001 | Homan et al. | |
| 6,233,600 B1 | 5/2001 | Salas et al. | |
| 6,249,805 B1 | 6/2001 | Fleming, III | |
| 6,252,588 B1 | 6/2001 | Dawson | |
| 6,253,231 B1 | 6/2001 | Fujii | |
| 6,256,663 B1 * | 7/2001 | Davis | 709/204 |
| 6,272,493 B1 | 8/2001 | Pasquali | |
| 6,272,593 B1 | 8/2001 | Dujari | |
| 6,275,849 B1 | 8/2001 | Ludwig | |
| 6,301,710 B1 | 10/2001 | Fujiwara | |
| 6,305,942 B1 | 10/2001 | Block et al. | |
| 6,311,211 B1 | 10/2001 | Shaw et al. | |
| 6,317,722 B1 | 11/2001 | Jacobi et al. | |
| 6,323,853 B1 | 11/2001 | Hedloy | |
| 6,327,612 B1 | 12/2001 | Watanabe | |
| 6,332,156 B1 * | 12/2001 | Cho et al. | 709/206 |
| 6,336,216 B1 | 1/2002 | Curtis et al. | |
| 6,351,763 B1 | 2/2002 | Kawanaka | |
| 6,353,926 B1 | 3/2002 | Parthesarathy et al. | |
| 6,359,270 B1 * | 3/2002 | Bridson | G06Q 10/107 219/679 |
| 6,360,221 B1 | 3/2002 | Gough et al. | |
| 6,361,326 B1 | 3/2002 | Fontana et al. | |
| 6,366,949 B1 * | 4/2002 | Hubert | H04L 51/08 709/203 |
| 6,381,592 B1 | 4/2002 | Reuning | |
| 6,381,634 B1 | 4/2002 | Tello et al. | |
| 6,385,644 B1 | 5/2002 | Devine et al. | |
| 6,389,455 B1 | 5/2002 | Fuisz | |
| 6,393,463 B1 | 5/2002 | Fuchigami | |
| 6,393,465 B2 | 5/2002 | Leeds | |
| 6,400,810 B1 | 6/2002 | Skladman et al. | |
| 6,405,243 B1 | 6/2002 | Nielsen | |
| 6,405,244 B1 | 6/2002 | Bando et al. | |
| 6,415,332 B1 | 7/2002 | Tuel, Jr. | |
| 6,427,164 B1 | 7/2002 | Reilly | |

(56) References Cited

U.S. PATENT DOCUMENTS

| | | | |
|---|---|---|---|
| 6,438,583 B1 | 8/2002 | McDowell et al. | |
| 6,442,600 B1 | 8/2002 | Anderson | |
| 6,449,635 B1 | 9/2002 | Tilden, Jr. et al. | |
| 6,449,657 B2 | 9/2002 | Stanbach, Jr. et al. | |
| 6,463,463 B1 | 10/2002 | Godfrey et al. | |
| 6,473,407 B1* | 10/2002 | Ditmer | G06F 11/0709 370/252 |
| 6,499,108 B1 | 12/2002 | Johnson | |
| 6,510,438 B2 | 1/2003 | Hasegawa | |
| 6,516,351 B2 | 2/2003 | Borr | |
| 6,529,936 B1 | 3/2003 | Mayo | |
| 6,529,946 B2 | 3/2003 | Yokono et al. | |
| 6,549,612 B2 | 4/2003 | Gifford et al. | |
| 6,564,383 B1* | 5/2003 | Combs | H04N 7/163 348/465 |
| 6,593,973 B1 | 7/2003 | Sullivan et al. | |
| 6,609,196 B1 | 8/2003 | Dickinson, III et al. | |
| 6,611,812 B2 | 8/2003 | Hurtado et al. | |
| 6,633,316 B1 | 10/2003 | Maddalozzo, Jr. et al. | |
| 6,636,888 B1 | 10/2003 | Bookspan et al. | |
| 6,651,087 B1 | 11/2003 | Dennis | |
| 6,654,779 B1 | 11/2003 | Tsuei | |
| 6,654,787 B1 | 11/2003 | Aronson et al. | |
| 6,668,278 B1 | 12/2003 | Yen et al. | |
| 6,684,332 B1 | 1/2004 | Douglas | |
| 6,697,842 B1 | 2/2004 | Smith et al. | |
| 6,721,784 B1 | 4/2004 | Leonard et al. | |
| 6,731,314 B1 | 5/2004 | Cheng et al. | |
| 6,732,149 B1 | 5/2004 | Kephart | |
| 6,745,226 B1 | 6/2004 | Guedalia | |
| 6,757,714 B1 | 6/2004 | Hansen | |
| 6,757,720 B1 | 6/2004 | Weschler, Jr. | |
| 6,760,750 B1 | 7/2004 | Boneh et al. | |
| 6,769,130 B1 | 7/2004 | Getsin et al. | |
| 6,775,689 B1* | 8/2004 | Raghunandan | G06Q 10/107 709/204 |
| 6,779,178 B1 | 8/2004 | Lloyd et al. | |
| 6,785,867 B2 | 8/2004 | Shaffer et al. | |
| 6,792,082 B1 | 9/2004 | Levine | |
| 6,873,982 B1 | 3/2005 | Bates et al. | |
| 6,892,226 B1 | 5/2005 | Tso et al. | |
| 6,944,621 B1 | 9/2005 | Collart | |
| 6,964,012 B1 | 11/2005 | Zirngibl et al. | |
| 6,981,214 B1 | 12/2005 | Miller et al. | |
| 7,051,019 B1 | 5/2006 | Land et al. | |
| 7,076,730 B1* | 7/2006 | Baker | G06Q 10/107 709/206 |
| 7,089,194 B1 | 8/2006 | Berstis et al. | |
| 7,158,986 B1 | 1/2007 | Oliver et al. | |
| 7,222,159 B2 | 5/2007 | Miller et al. | |
| 7,272,604 B1 | 9/2007 | Hedloy | |
| 7,356,332 B2 | 4/2008 | Pell et al. | |
| 7,493,390 B2 | 2/2009 | Bobde et al. | |
| 7,613,695 B1 | 11/2009 | Solomon et al. | |
| 7,720,931 B2 | 5/2010 | Mei et al. | |
| 7,840,639 B1 | 11/2010 | Gough | |
| 7,925,754 B2 | 4/2011 | Limont et al. | |
| 2001/0042002 A1* | 11/2001 | Koopersmith | G06Q 30/02 705/26.3 |
| 2001/0044828 A1 | 11/2001 | Kikinis | |
| 2001/0052019 A1* | 12/2001 | Walters et al. | 709/231 |
| 2002/0006826 A1* | 1/2002 | Hansted | 463/42 |
| 2002/0007356 A1 | 1/2002 | Rice | |
| 2002/0010794 A1 | 1/2002 | Stanbach, Jr. et al. | |
| 2002/0032738 A1 | 3/2002 | Foulger et al. | |
| 2002/0056123 A1 | 5/2002 | Liwerant et al. | |
| 2002/0059347 A1 | 5/2002 | Shaffer et al. | |
| 2002/0075305 A1 | 6/2002 | Beaton et al. | |
| 2002/0112005 A1 | 8/2002 | Namias | |
| 2002/0112007 A1 | 8/2002 | Wood et al. | |
| 2002/0131561 A1* | 9/2002 | Gifford | G06Q 10/107 379/67.1 |
| 2002/0138588 A1* | 9/2002 | Leeds | 709/217 |
| 2002/0152272 A1 | 10/2002 | Yairi | |
| 2002/0188683 A1* | 12/2002 | Lytle et al. | 709/206 |
| 2002/0199095 A1 | 12/2002 | Bandini et al. | |
| 2003/0018816 A1 | 1/2003 | Godfrey et al. | |
| 2003/0095642 A1 | 5/2003 | Cloutier et al. | |
| 2003/0126215 A1 | 7/2003 | Udell et al. | |
| 2003/0135567 A1 | 7/2003 | Reilly | |
| 2003/0135853 A1 | 7/2003 | Goldman et al. | |
| 2003/0217005 A1 | 11/2003 | Drummond et al. | |
| 2005/0081059 A1 | 4/2005 | Bandini et al. | |
| 2005/0204011 A1 | 9/2005 | Velayudham | |
| 2005/0228899 A1 | 10/2005 | Wendkos et al. | |
| 2005/0246752 A1 | 11/2005 | Liwerant et al. | |
| 2005/0256929 A1 | 11/2005 | Bartol et al. | |
| 2005/0261011 A1 | 11/2005 | Scott | |
| 2006/0009249 A1* | 1/2006 | Fu et al. | 455/518 |
| 2006/0010214 A1 | 1/2006 | McDowell et al. | |
| 2006/0026438 A1 | 2/2006 | Stem et al. | |
| 2006/0168346 A1 | 7/2006 | Chen et al. | |
| 2007/0087766 A1 | 4/2007 | Hardy et al. | |
| 2007/0250586 A1 | 10/2007 | Kirsch | |
| 2008/0071612 A1 | 3/2008 | Mah et al. | |
| 2008/0133716 A1 | 6/2008 | Rao et al. | |
| 2008/0195953 A1 | 8/2008 | Sen | |
| 2009/0100378 A1 | 4/2009 | Klassen et al. | |
| 2010/0017864 A1 | 1/2010 | Codignotto | |
| 2010/0325728 A1 | 12/2010 | Pang | |

FOREIGN PATENT DOCUMENTS

| | | |
|---|---|---|
| EP | 0 816 090 A2 | 1/1998 |
| JP | 7-325827 | 12/1995 |
| JP | 10-171727 | 6/1998 |
| JP | 2000176134 A * | 6/2000 |
| JP | 2001111601 | 4/2001 |
| WO | WO 98/58321 | 12/1998 |
| WO | WO 98/58332 | 12/1998 |

OTHER PUBLICATIONS

Steve Lopez; Correspondence Chess; Spring 1998; Chess base USA; 5 Pages.*

Alvear J., "Streaming E-Mail", Web Oevelopper.Com Guide to Streaming Multimedia, New York: John Wiley & Sons, US, pp. 304-317 (1998), XP-002150023.

Tolba et aL, "Pure Java-based Streaming MPEG Player", part ofthe SPIE Conference on Multimedia Systems and Applications, Boston Massachusetts, Nov. 1998. SPIE vol. 3528, pp. 216-224.

Tech Web Encyclopedia, "Streaming" definition, 1 page.

Heinz Tschabitcher; How to mail all address book entries in windown live mail or outlook express; About.com; 2 Pages.

Exhibit C, which is a print out of a page from Activegrams with the address: http:/www.activegrams.com?cgi-bin/viewactivegrams?cgi?1411215ki on Sep. 21, 1999.

World Wide Web e-mail service provider Hotmail (hereinafter "Hotmail") available through the web site http://www.msn.com provided by the Microsoft Corporation, Exhibit A pp. 1 through 3 enclosed herewith is a print out of displays of another feature of Hotmail called Mail Handling.

Real Networks, Inc. (hereinafter "RealNetworks") a corporation with headquarters at 2601 Elliott Avenue, Suite 1000, Seattle, WA 98121, offers a line of products that include Real Player and Real Audio and the like. Versions of these products may be downloaded from the Internet at http://www.real.com.

The Internet article, "Death to Spam, A Guide to Dealing with Unwanted E-Mail" (herein after "Death to Spam") obtained from the World Wide Web Address http://www.mindworkshop.com/alchemy/nospam.html on Sep. 21, 1999.

The Internet article, "What can you do about bad email?" (herein after "Bad Email") obtained from the World Wide Web address http://www.oitc.com/Disney/WhatToDo.html, on Sep. 21, 1999.

The Internet article, "The Anti-Spam HowTo" obtained from the World Wide Web address http://www.zikzak.zikzak.net/-acb/features/anti-spam-howto.html on Sep. 21, 1999.

The Internet article, "no Junk E-Mail Database" (herein after "No Junk E-Mail") obtained from the World Wide Web address http://www.glr.com/nojunk.html on Sep. 21, 1999.

(56) References Cited

OTHER PUBLICATIONS

The pages obtained on Sep. 21, 1999 from the website entitled "Do-Not-Spam.com" located at the World Wide Web address http://www.do-not-spam.com/.
Exhibit B is a print out of a page from Active grams with the address: http://www.activegrams.com?cgi-bin/viewactivegrams2 cgi?141121Ski on Sep. 16, 1999.
The article, "Enhancing documents with embedded programs: How Ness extends insets in the Andrew ToolKit" obtained from CH2854-8/90/0000/0023$01.00 1990 IEEE.
The article, "Object-oriented design of a Message Handling System protocol", obtained from CCECE/CCGEI'95.
The article, "Secure Offical Document Mail Systems for Office Automation", obtained from 0-7803-3913-4-9/$4.00, 1997 IEEE.
The Internet article, "Digital Multimedia Content Management for Networked Information Access: Issues and Discussion" obtained from heathery@research.panasonic.com.
The article, "Consumer Electronics" obtained from IEEE Spectrum Jan. 1997.
The Internet article, "Windows 98 Installation & Configuration Handbook" obtained from website address http://cma.zdnet.com/book/win98config/ch17/ch17.htm.
Presentation on "JavaOS Based Network Computing", from Sun's 1997 Worldwide Java Developer Conference.
The Internet Article, "World Wide Web Security", obtained from website, http://www.cs.jmu.edu/common/coursedocs/cs685c/WebSecurity/web_security.
The article, "An Access Control System for Multimedia Applications" obtained from Alexandros Kadoglou and Ioannis Pitas, Department of Informatics, University of Thessaloniki, 54006 Thessaloniki, Greece.
The Article, "Java, the Web, and Software Development", obtained from 1996 IEEE Magazine Aug. 1996 Edition.
A PhoneBoy Primer on: Tracking Down Spammers, Jul. 26, 1997.
Erradey, Object-oriented design of a message handling system protocol, Canadian Conference on Electrical and Computer Engineering, 1995, vol. 2, Sep. 5-8, 1995, pp. 842-845.
Gough, Decision on Appeal, U.S. Appl. No. 09/721,552, Sep. 25, 2012, 12 pgs.
Gough, Decision on Appeal, U.S. Appl. No. 09/997,322, Sep. 17, 2012, 18 pgs.
Gough, Examiner's Answer, U.S. Appl. No. 09/400,712, Aug. 17, 2004, 12 pgs.
Gough, Examiner's Answer, U.S. Appl. No. 09/400,712, Apr. 20, 2007, 11 pgs.
Gough, Examiner's Answer, U.S. Appl. No. 09/721,552, Dec. 20, 2010, 23 pgs.
Gough, Examiner's Answer, U.S. Appl. No. 09/997,322, Jun. 23, 2010, 26 pgs.
Gough, Final Office Action, U.S. Appl. No. 09/400,708, Jul. 11, 2005, 6 pgs.
Gough, Final Office Action, U.S. Appl. No. 09/400,708, Nov. 21, 2002, 9 pgs.
Gough, Final Office Action, U.S. Appl. No. 09/400,711, Sep. 10, 2003, 7 pgs.
Gough, Final Office Action, U.S. Appl. No. 09/400,712, Jul. 1, 2013, 9 pgs.
Gough, Final Office Action, U.S. Appl. No. 09/400,712, Jan. 4, 2011, 9 pgs.
Gough, Final Office Action, U.S. Appl. No. 09/400,712, Sep. 25, 2003, 8 pgs.
Gough, Final Office Action, U.S. Appl. No. 09/401,026, Jan. 4, 2001, 8 pgs.
Gough, Final Office Action, U.S. Appl. No. 09/401,028, Nov. 18, 2002, 8 pgs.
Gough, Final Office Action, U.S. Appl. No. 09/493,468, Sep. 2, 2008, 24 pgs.
Gough, Final Office Action, U.S. Appl. No. 09/493,468, Jun. 25, 2012, 22 pgs.
Gough, Final Office Action, U.S. Appl. No. 09/493,468, Aug. 30, 2010, 22 pgs.
Gough, Final Office Action, U.S. Appl. No. 09/721,552, Aug. 19, 2005, 17 pgs.
Gough, Final Office Action, U.S. Appl. No. 09/997,322, Aug. 10, 2007, 10 pgs.
Gough, Final Office Action, U.S. Appl. No. 09/997,322, Dec. 22, 2008, 17 pgs.
Gough, Final Office Action, U.S. Appl. No. 12/142,606, Oct. 7, 2010, 14 pgs.
Gough, Final Office Action, U.S. Appl. No. 12/142,715, Mar. 2, 2012, 11 pgs.
Gough, Final Office Action, U.S. Appl. No. 12/142,728, Aug. 29, 2013, 18 pgs.
Gough, Final Office Action, U.S. Appl. No. 12/142,745, Feb. 3, 2012, 9 pgs.
Gough, Final Office Action, U.S. Appl. No. 12/142,750, Jun. 22, 2011, 21 pgs.
Gouth, Final Office Action, U.S. Appl. No. 12/143,785, Dec. 17, 2012, 9 pgs.
Gough, Final Office Action, U.S. Appl. No. 12/143,785, Oct. 22, 2010, 16 pgs.
Gough, Final Office Action, U.S. Appl. No. 12/143,786, Nov. 23, 2011, 9 pgs.
Gough, Notice of Allowance, U.S. Appl. No. 09/400,708, Apr. 2, 2010, 4 pgs.
Gough, Notice of Allowance, U.S. Appl. No. 09/400,708, Dec. 2, 2009, 4 pgs.
Gough, Notice of Allowance, U.S. Appl. No. 09/400,708, Jul. 12, 2010, 4 pgs.
Gough, Notice of Allowance, U.S. Appl. No. 09/400,708, Jun. 25, 2004, 4 pgs.
Gough, Notice of Allowance, U.S. Appl. No. 09/400,708, Oct. 28, 2010, 4 pgs.
Gough, Notice of Allowance, U.S. Appl. No. 09/400,781, Aug. 12, 2003, 6 pgs.
Gough, Notice of Allowance, U.S. Appl. No. 09/401,026, Aug. 23, 2001, 3 pgs.
Gough, Notice of Allowance, U.S. Appl. No. 09/401,028, Jun. 17, 2003, 3 pgs.
Gough, Notice of Allowance, U.S. Appl. No. 09/997,322, Jul. 24, 2013, 6 pgs.
Gough, Office Action, U.S. Appl. No. 09/400,708, Jul. 9, 2008, 12 pgs.
Gough, Office Action, U.S. Appl. No. 09/400,708, Mar. 12, 2009, 12 pgs.
Gough, Office Action, U.S. Appl. No. 09/400,708, Mar. 13, 2006, 6 pgs.
Gough, Office Action, U.S. Appl. No. 09/400,708, Oct. 24, 2006, 8 pgs.
Gough, Office Action, U.S. Appl. No. 09/400,708, Sep. 24, 2003, 6 pgs.
Gough, Office Action, U.S. Appl. No. 09/400,708, Mar. 27, 2002, 6 pgs.
Gough, Office Action, U.S. Appl. No. 09/400,711, Jun. 11, 2002, 7 pgs.
Gough, Office Action, U.S. Appl. No. 09/400,711, Mar. 13, 2003, 11 pgs.
Gough, Office Action, U.S. Appl. No. 09/400,711, Sep. 21, 2004, 14 pgs.
Gough, Office Action, U.S. Appl. No. 09/400,712, Jul. 9, 2010, 9 pgs.
Gough, Office Action, U.S. Appl. No. 09/400,712, Oct. 11, 2012, 10 pgs.
Gough, Office Action, U.S. Appl. No. 09/400,712, Dec. 19, 2013, 7 pgs.
Gough, Office Action, U.S. Appl. No. 09/400,712, Dec. 27, 2002, 9 pgs.
Gough, Office Action, U.S. Appl. No. 09/400,781, Dec. 16, 2002, 6 pgs.
Gough, Office Action, U.S. Appl. No. 09/400,781, Mar. 26, 2002, 5 pgs.

(56) References Cited

OTHER PUBLICATIONS

Gough, Office Action, U.S. Appl. No. 09/401,026, Aug. 2, 2000, 7 pgs.
Gough, Office Action, U.S. Appl. No. 09/401,028, Jun. 5, 2002, 6 pgs.
Gough, Office Action, U.S. Appl. No. 09/493,468, Dec. 5, 2007, 20 pgs.
Gough, Office Action, U.S. Appl. No. 09/493,468, Dec. 8, 2009, 23 pgs.
Gough, Office Action, U.S. Appl. No. 09/493,468, Oct. 12, 2011, 25 pgs.
Gough, Office Action, U.S. Appl. No. 09/493,468, Jan. 13, 2004, 11 pgs.
Gough, Office Action, U.S. Appl. No. 09/493,468, Nov. 21, 2002, 10 pgs.
Gough, Office Action, U.S. Appl. No. 09/493,468, Jul. 23, 2003, 11 pgs.
Gough, Office Action, U.S. Appl. No. 09/721,552, Mar. 1, 2005, 13 pgs.
Gough, Office Action, U.S. Appl. No. 09/721,552, Feb. 11, 2004, 10 pgs.
Gough, Office Action, U.S. Appl. No. 09/721,552, Jan. 22, 2010, 21 pgs.
Gough, Office Action, U.S. Appl. No. 09/997,322, Mar. 18, 2008, 14 pgs.
Gough, Office Action, U.S. Appl. No. 09/997,322, Aug. 25, 2004, 11 pgs.
Gough, Office Action, U.S. Appl. No. 09/997,322, Nov. 29, 2012, 5 pgs.
Gough, Office Action, U.S. Appl. No. 12/142,606, Mar. 19, 2010, 12 pgs.
Gough, Office Action, U.S. Appl. No. 12/142,606, Jan. 20, 2012, 22 pgs.
Gough, Office Action, U.S. Appl. No. 12/142,715, Jun. 23, 2011, 14 pgs.
Gough, Office Action, U.S. Appl. No. 12/142,728, Mar. 5, 2010, 10 pgs.
Gough, Office Action, U.S. Appl. No. 12/142,728, Feb. 15, 2012, 14 pgs.
Gough, Office Action, U.S. Appl. No. 12/142,728, Dec. 19, 2012, 20 pgs.
Gough, Office Action, U.S. Appl. No. 12/142,728, Nov. 24, 2010, 10 pgs.
Gough, Office Action, U.S. Appl. No. 12/142,728, Feb. 27, 2014, 18 pgs.
Gough, Office Action, U.S. Appl. No. 12/142,745, Apr. 27, 2011, 8 pgs.
Gough, Office Action, U.S. Appl. No. 12/142,750, Feb. 1, 2010, 9 pgs.
Gough, Office Action, U.S. Appl. No. 12/142,750, Jun. 19, 2012, 18 pgs.
Gough, Office Action, U.S. Appl. No. 12/142,750, Sep. 28, 2010, 16 pgs.
Gough, Office Action, U.S. Appl. No. 12/143,785, Jan. 28, 2010, 12 pgs.
Gough, Office Action, U.S. Appl. No. 12/143,785, Jul. 28, 2011, 15 pgs.
Gough, Office Action, U.S. Appl. No. 12/143,786, Mar. 16, 2011, 8 pgs.
Gough, Office Action, U.S. Appl. No. 12/952,176, Jul. 31, 2012, 7 pgs.
Gough, Patent Board Decision, U.S. Appl. No. 09/400,712, Mar. 24, 2010, 14 pgs.
Hansen, Enhancing documents with embedded programs: How Ness extends insets in the Andrew Toolkit, IEEE, 1990.
Pomeranz, Peri Practicum: The Emal of the Species, May 24, 1997.
Yang, Secure official document mail systems for office automation, Proceedings, Security Technology, 1997.
Yu, Digital multimedia content management for networked information access: issues and discussion, Advance Issues of E-Commerce and Web-Based Information Systems, WECWIS, 1999, Apr. 8-9, 1999, pp. 75-80.
Gough, Final Office Action, U.S. Appl. No. 12/952,176, Oct. 28, 2013, 9 pgs.
Gough, Final Office Action, U.S. Appl. No. 12/142,728, Jun. 24, 2015, 12 pgs.

\* cited by examiner

E-MAIL WITH DISCRETIONARY FUNCTIONALITY

RELATED APPLICATIONS

This application is a divisional of U.S. Ser. No. 09/997,322 filed Nov. 27, 2001, which is a continuation of U.S. Ser. No. 09/401,026 filed Sep. 21, 1999, both of which are incorporated herein by reference. This application further claims the benefits of U.S. Ser. No. 09/400,708 filed Sep. 21, 1999 and U.S. Ser. No. 09/400,712 filed Sep. 21, 1999, both of which are incorporated herein by reference.

BACKGROUND

This invention relates generally to electronic messages and, more particularly e-mail systems utilizing an HTML format for delivery over a TCP/IP protocol network.

E-mail systems of various types have been available for many years. In such systems, user computers or "machines" typically are either intermittently or are permanently connected to a network, such that electronic mail ("e-mail") can be sent from one user's machine to another. Most e-mail systems allow address books and distribution lists to be maintained, such that the e-mail can be sent to one or more designated user machines.

Proprietary e-mail systems have, of course, the associated cost of implementing and maintaining both the network and the e-mail system. With the advent of global networking systems, the cost of e-mail systems has lessened and the popularity of e-mail systems has increased. For example, proprietary providers such as America On-Line (AOL) provide a number of network services, including e-mail, for a set monthly fee. Other web-based service providers, such as Hotmail from Microsoft, Inc., provide free e-mail services to anyone with access to the Internet. While this typically requires the payment of a monthly fee to an Internet Service Provider, other service providers such as AltaVista of Compaq Computer Corporation provide free Internet service. The combination of free e-mail services with or without free Internet services has resulted in an explosion of e-mail accounts and of e-mail messages.

A problem with e-mail documents of the prior art is that they tend to be fairly plain and, therefore, not terribly compelling as a transmission media. Most e-mail is plain text, although the capability of including hypertext markup language (HTML) can add some visual interest. There are even some e-mail providers which provide the capability of embedding static and dynamic graphics. However, e-mail is truly a "push" technology in that it is "pushed" from a server to a recipient without any real interactivity between the recipient and the received media. For this reason, while e-mail such as jokes, etc. may be passed around, the message is quickly discarded and forgotten.

The present invention provides an enhanced e-mail method and system which increases the enjoyment and usage of e-mail systems, and wide-scale distribution of enhanced e-mail messages. As such, it can be advertiser supported to provide "free" e-mail services for members. Further enhancements can support paid membership services, and commercial services can also be provided.

SUMMARY OF THE INVENTION

An embodiment, by way of non-limiting example, comprises an e-mail method including creating an e-mail having discretionary functionality and sending the e-mail.

An embodiment, by way of non-limiting example, comprises an e-mail server including a computer configured to create an e-mail having discretionary functionality and to send the e-mail.

An embodiment, by way of non-limiting example, comprises a computer program embodied on computer-readable media including software segments for creating an e-mail having discretionary functionality and software segments for sending the e-mail.

These and other advantageous embodiments will become apparent to those skilled in the art upon a reading of the following descriptions of the invention and a study of the several figures of the drawing.

DETAILED DESCRIPTION OF THE PREFERRED EMBODIMENTS

Figure 1:
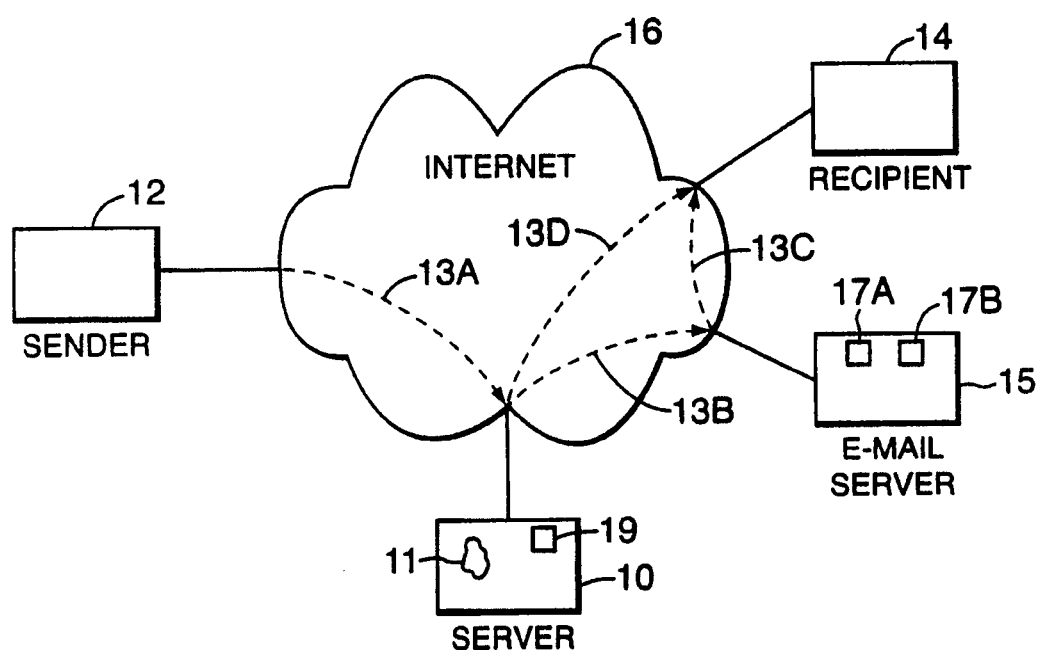
FIG. 1 is a depiction of an Internet based e-mail system in accordance with the present invention.

FIG. 1 illustrates a server machine 10, a sender machine 12, and a recipient machine 14 coupled to a global network, such as the Internet 16. By "machine" it is meant computer systems or other digital electronic device capable of communicating with a network, such as Internet 16. A typical "machine" is a personal computer, workstation, or other computer operating with a suitable operating system such as Windows NT, the Macintosh OS, Linux, Solaris, Unix, etc. Such computers typically utilize one or more microprocessors, volatile and non-volatile memories (computer readable media), and input/output (I/O) devices which allow, for example, communication with users and with other machines, networks, and peripherals. The network in this example is the Internet operating on the well-know TCP/IP packet network protocols, but other networks such as Intranets, Extranets, and networks working on other protocols (e.g. Netware, Appleshare, etc.) are also suitable for embodiments of the present invention.

In the present invention, server machine 10 "hosts" an e-mail web site 11. A sender at sender machine 12 can "upload" or enter message content to the web site 11 through the Internet 16 as indicated at 13A. This is typically accomplished via a web browser on sender machine 12 "opening" the web site 11 on the server 10. The web site 11 then, under the guidance of the sender, "enhances" the message content and sends or "e-mails" the message to one or more recipient mail boxes as illustrated at 13B. In this instance, mail boxes 17A, 17B, etc. are hosted by an e-mail server machine 15 connected to the Internet 16. Such e-mail mailboxes are provided by a variety of vendors, including America On Line (AOL), Hotmail, etc. The recipient then accesses his or her mail box to receive the enhanced e-mail at the recipient machine 14 via the Internet 16 as indicated at 13C. Alternatively, if the recipient is a member of the web site 11, he or she can receive the e-mail directly from an e-mail box 19 on the server 10 as illustrated at 13D. As noted previously, some or all of the various processes, services, mail boxes, etc. may be distributed around the network 16, as will be appreciated by those skilled in the art.

Figure 2:
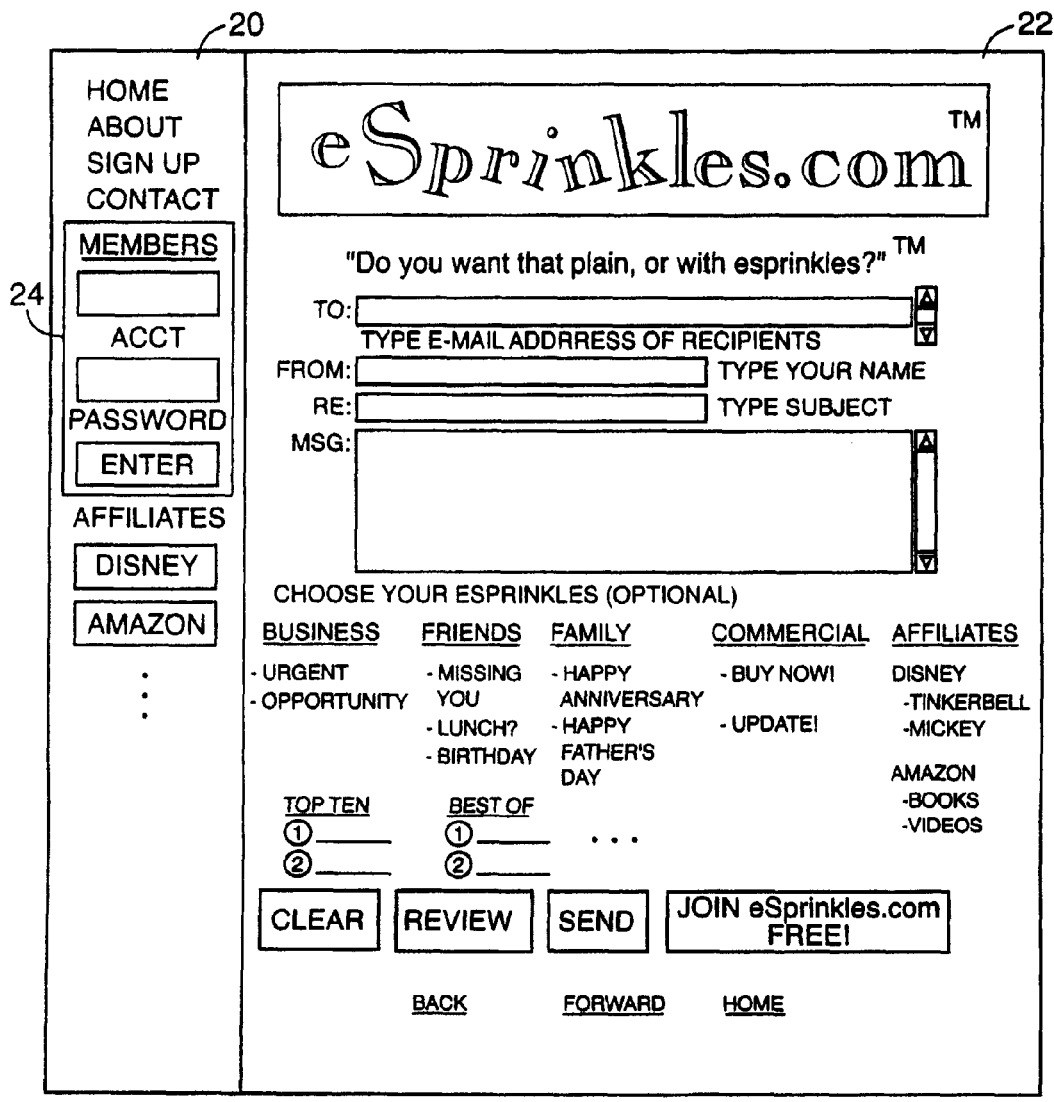
FIG. 2 is an illustration of an exemplary home page of the present invention.

In FIG. 2, a "home page" 18 of the present invention is "hosted" on a server 10 connected to the Internet 16. By "hosted" it is meant that a computer program implementing a process capable of displaying the home page 18 and interacting with users connected to the Internet 16 resides, in part or in whole, on the server 10. It should be noted that the Internet 16 is suitable for supporting distributed computing, where the computer implemented processes are shared among multiple machines, as will be appreciated by those skilled in the art.

In the present example, the home page 18 includes a navigation bar 20 and a content area 22. The navigation bar 20 include hypertext "links", typically to other pages supported by the server 10 or by other servers (e.g. by a server of an affiliate). In this example, the navigation bar includes links to "home", "about", "sign-up", and "contact" pages, which are preferably (but not necessarily) hosted on the server 10. The "home" link will return to the content area 22 of the home page. The "about" link will create a content in content area 22 that describes the company "eSprinkles.com" and its services. The "sign-up" link will create a content in content area 22 for member signup. This page will be described in greater detail with respect to FIG. 2B. The "contact" line will create a content in content area 22 for contacting eSprinkles.com, such as by e-mail, telephone, postal service mail, etc.

The navigation bar 20, in this example, also includes a member area 24 which can be accessed by typing in an account, a password, and "clicking" on an "enter" key. This will create a content in content area 22 which permits a number of member services that are not available to non-members. An example of a members content area will be discussed with reference to FIG. 2A.

Also in the exemplary navigation bar 20 is an area where "Affiliates" are listed. These Affiliates can have a business relationship with the e-mail hosting company (eSprinkles.com in this example), or may have paid to be listed as an Affiliate, or may pay for "click throughs" from users at the eSprinkles.com web site.

Typically, the navigation bar 20 will remain regardless of the content (e.g. page or other content) of the content area 22. This provides a consistent and convenient method for navigating the entire publicly accessible "web site" of the e-mail provider, in this example, the public web site of eSprinkles.com.

The content area 22 of the home page 18 has a header "eSprinles.com", as well as its trademarks "Do you want that plain, or with eSprinkles?" There are then a number of fields that can be filled-in, including a "To:" field for e-mail addresses of recipients. This can be one or more e-mail addresses such as "jdoe@aol.com" or "jdoe@aol.com; rsmith@hotmail.com; fjones@esprinkles.com." Then, there is a "From:" field where the sender can type his or her name, such as "Sam Adams" and an "Re:" field where the sender can send a regarding message such as "Hi Jane!!" The message itself can be typed into a message field. Scroll bars can be used for fields that might contain more information that can be displayed within the "window" of the field, such as the "To:" field and the "Msg:" field.

The sender then has the option of enhancing his or her message with eSprinkles. These are shown arranged by categories such as "Business", "Friends", "Family", "Commercial", and "Affiliates." Of course, these categories are merely exemplary, and other categories are contemplated. For example, and without limitation, there can be a "Top Ten" category and a "Best Of" category. Within each of the categories, there are a number of enhancements or "eSprinkle" e-mail enhancements. For example, if the "Tinkerbell" eSprinkle e-mail enhancement is chosen from the Disney affiliate, a Tinkerbell could flutter across the e-mail sprinkling fairy dust and then land on a Disney link button.

At the bottom of the screen, a number of "buttons" may be provided to provide specialized functions. For example, a "Clear" button can clear the field of the content area 22. A "Review" button will allow the sender to review the e-mail message, with its enhancements (if any) before sending the enhanced e-mail message. A "Send" button allows the e-mail to be sent, and a "Join eSprinkles.com Free!" button allows a user to join the eSprinkles web site as a member in order to enjoy additional features of the e-mail system, such as being able to receive e-mail at an eSprinkles.com e-mail address. At the bottom of content area 22 are some links to go "Back" one page, "Forward" one page, or "Home."

Figure 2A:
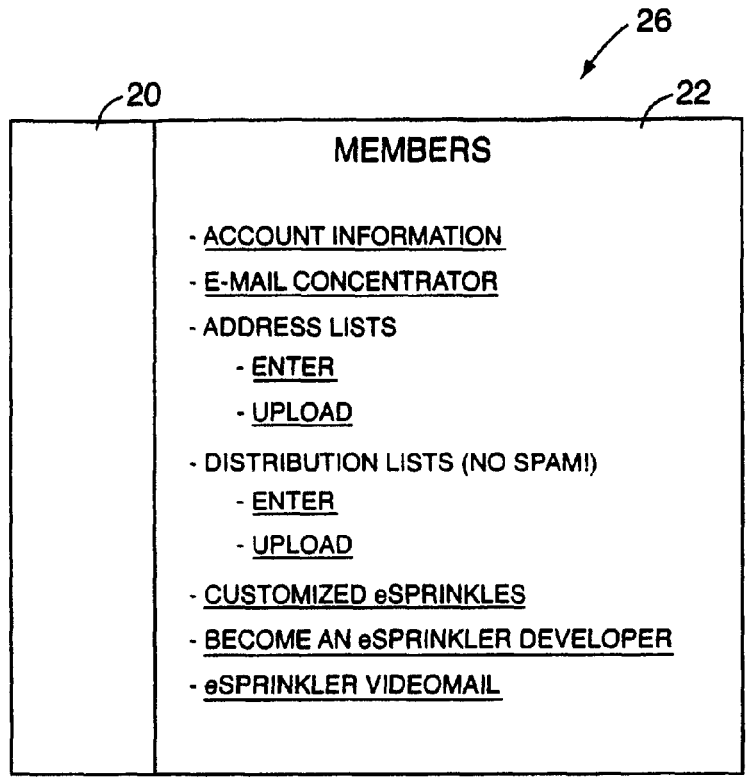
FIG. 2A is an illustration of an exemplary member's page of the present invention.

A members page 26 is shown in FIG. 2A. The navigation bar 20 typically stays essentially the same, while the content area 22 displays content that is available only to members of the web site. This page 26 is accessed by the members area 24 of the navigation bar 20 (see FIG. 1) by entering the account number and password. The content area 22 of the members page 26 of FIG. 2A in this example includes a number of links including "Account Information", "e-mail concentrator", "Enter" Address Lists, "Upload" Address Lists, "Enter" Distribution Lists, "Upload" Distribution Lists, "Customized eSprinkles", "Become an eSprinkle Developer", and "eSprinkle Video Mail." The Account Information opens a link or window or screen which allows a member to view, modify and/or update his or her member profile and other account information. The e-mail concentrator allows a user to set up a process by which e-mail from other e-mail accounts (e.g. AOL, Hotmail) is forwarded or "concentrated" at his or her eSprinkles e-mail account. As an option, notifications of the existence and use of the eSprinkles e-mail account may be sent to other accounts in an address book, manually entered, etc. The Address Lists "Enter" and "Upload" links allow e-mail addresses to be entered into the member's account, or to be uploaded to the member's account. To upload the e-mail addresses, a member can, for example, have a text-based list of his or her e-mail addresses as a file on his or her computer, and then direct the website to copy this file onto the member's website based address list. Similarly distribution lists such as "friends", "family", "club members", can be created or uploaded by the member to the website. The Customized eSprinkles can be of the member's own design, and stored on the website for future use. Members can also become eSprinkle developers, who may be included on the home page 18 should they create a notable eSprinkle e-mail enhancement. The eSprinkle VideoMail feature allows a window to be opened on an eSprinkle e-mail message that connects, via the Internet, to the eSprinkle website in order to play an audiovisual "VideoMail" message to the e-mail recipient.

Figure 2B:
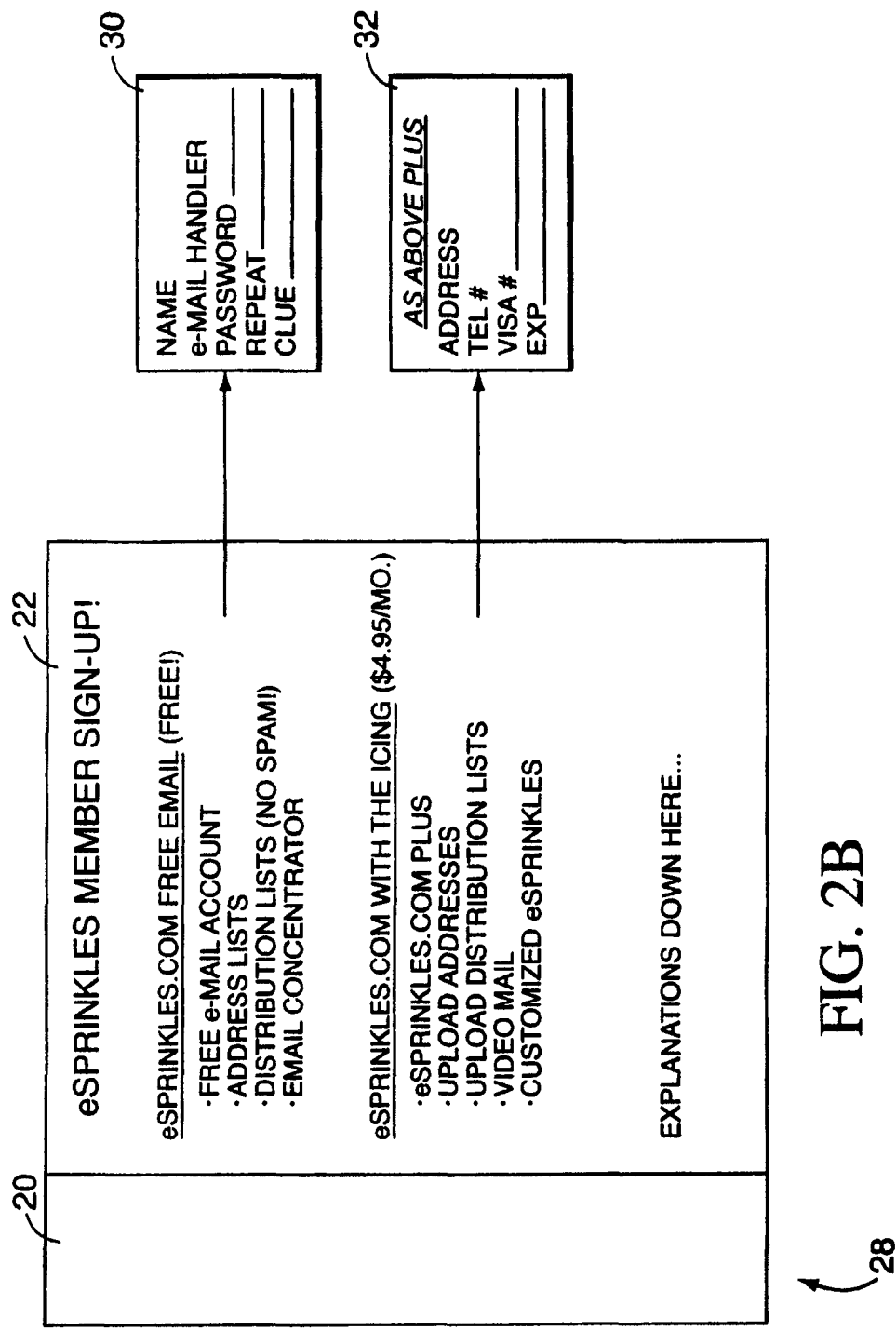
FIG. 2B is an illustration of an exemplary member sign-up page of the present invention.

FIG. 2B illustrates an exemplary member sign-up web page 28. More particularly, the web page 28 includes the navigation bar 20 and a content area 22 that includes, in this example, several membership options. More particularly, content area 22 gives the option of a free (advertising sponsored) e-mail service, or an enhanced e-mail service at a monthly charge. In an alternate embodiment of the present invention, a commercial version of the service allows for mass enhanced e-mail messaging (preferably of a non-spamming nature) at a fixed rate, e.g. for five cents a message. The advertising supported "free" e-mail can include banner advertisements (of the "click through" type or not), and buttons which provide hyperlinks to advertiser web pages. It will be appreciated that "click through" banner advertisements and buttons are very similar in nature. Advertisers can pay for each message sent, or for "click throughs" from the banners and buttons. The paid membership is designed for non-commercial users that are willing to pay for more enhanced e-mail functionality, such as the ability to create customized eSprinkle enhancements, to upload distribution lists, etc. The advertising may be omitted for paid memberships, although a link to the eSprinkle web site (which is a form of advertising by the e-mail system host) is likely to be included. In addition, it is contemplated that the ability to send audio and/or video information in the form of an e-mail will be a paid membership benefit, since such information requires a substantial amount of disk storage space on the server.

As seen in FIG. 2B, the exemplary member sign-up page includes hyperlinks labeled "eSprinkles.com Free eMail" and "eSprinkles.com With the Icing", for the free and paid membership services, respectively. The first link, in this example, opens a window or web page 30 which allows a user's name, e-mail "handle" or screen name, password, and password clue to be entered. This screen is kept very simple to encourage users to sign up for a free e-mail account. Alternatively, more information such as the member's postal service mailing address, other e-mail addresses, telephone numbers, member demographics, etc. can be asked, at the tradeoff of perhaps obtaining fewer free members. Signing up for the free service are intended to provide a number of member services such as a free e-mail account maintained at the server for the member, the ability to create address and distribution lists, and the ability to use the e-mail concentrator.

The "eSprinkles.com With the Icing" is a paid membership service for those willing to pay for additional member services. When accessing this second link of web page 28, a window or web page 32 is opened which asks for the information of page 30 and, in addition, address and credit card information so that the monthly charge can automatically be applied to the credit card. Some additional member services of the paid service are contemplated to include the ability to upload addresses and distribution lists, the ability to e-mail audio and video content, and the ability to create and edit their own enhancement content.

As mentioned previously, the membership page 28 contemplates non-commercial usage of the web site. As such, unlimited e-mails can be sent, but the ability to create large mailing lists is preferably curtailed. This is to prevent over-use by commercial entities and to prevent "spamming", i.e. unwanted e-mail broadcast to large distribution lists. It is contemplated that the free e-mail membership will have a very limited distribution list capability (e.g. 20 members in a distribution list), while the paid membership will have a somewhat larger list capability (e.g. 100 members in a distribution list). This will make it difficult for commercial users or "spammers" to create distribution lists of many thousands or even millions of e-mail addresses.

Also as mentioned previously, the present invention includes the ability to create commercial distribution lists as well. This can be implemented in several fashions. For one, the software providing the enhanced e-mail capability can be sold or licensed to large commercial users. Alternatively, the web server can provide this capability by allowing large distribution lists to be uploaded to the server, and then the e-mails can be sent to the recipients on the distribution lists. This second method also allows for easy monitoring of the number of sent and delivered e-mails for billing purposes to the commercial user.

Figure 3:
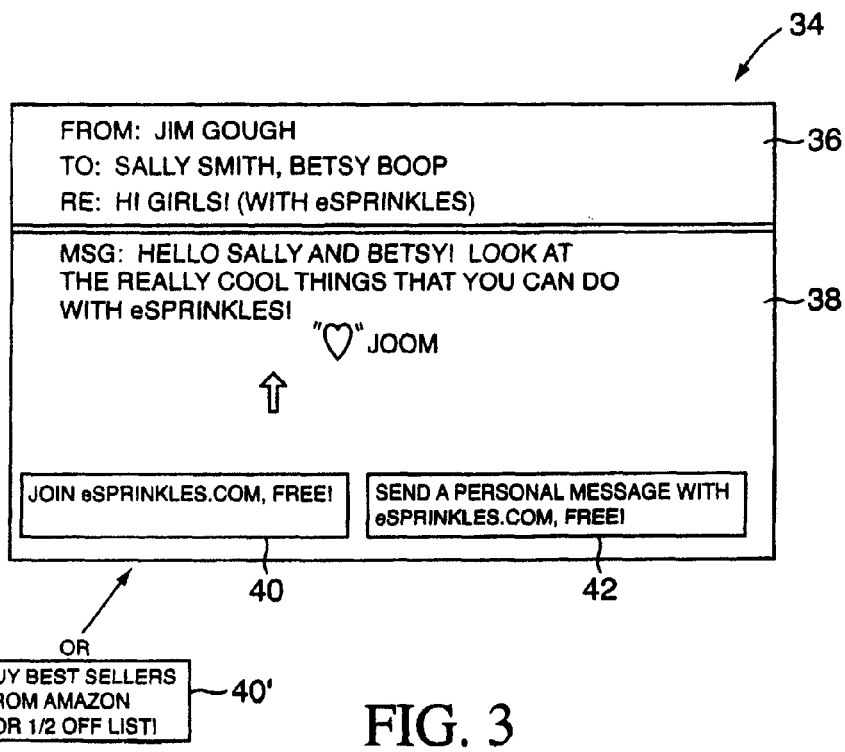
FIG. 3 is an illustration of an exemplary e-mail of the present invention.

In FIG. 3, an exemplary enhanced e-mail message 34 is illustrated. The e-mail message 34 includes a header 36 with sender, recipient, and "Re" information, and a body 38 with message content and advertising information. The message content can include message text input by the sender, and may be enhanced by a self-executing program. In this instance, the program replaces the word "I" with a pair of eyes having pupils that "look at" or track the cursor, and which also replaces the word "Love" with a beating heart. The advertising information includes banner/buttons 40 and 42. The advertising can be for a third party advertiser (amazon.com in this example) as illustrated at 40', or can be advertisement for the e-mail provider itself (eSprinkles.com in this example) at 40. By clicking on an advertising banner/button 40', the e-mail provider may be paid per click, e.g. ten cents a click-through, or may be paid by a percentage of the sales made by the advertiser to the person who clicked on the banner/button.

It will therefore be appreciated that the present invention includes a method for providing an e-mail system including that includes providing a server 10 connected to a network 16; inputting a message from a sender into the server to be sent as e-mail to at least one recipient mail box on the network; enhancing the e-mail message with a self-executing programmable enhancement; and delivering the e-mail over the network to the at least one recipient mail box. In the present example, the sender uses a sender machine 12 provided with a web browser to interact with a web site hosted on the server 10, while the recipient uses a recipient machine 14 which can interact with the web site on server 10 if the recipient is a member with an e-mail box on the server 10. Alternatively, the recipient can be in communication with a mail box hosted anywhere over the network 16 by connecting to the network through the services of an Internet Service Provider (ISP). Therefore, the recipient(s) do not need to have direct interaction with the server 10 of the present invention in order to receive enhanced e-mail.

It will also be appreciated that an e-mail system of the present invention includes a server 10 coupled to a wide area network, such as the Internet 16; and a web site hosted by the server that is capable of at least temporarily storing a message to be sent as e-mail over the wide area network to at least one recipient mail box, the web site providing at least one process for enhancing the message with a self-executing programmable enhancement and information of an advertising nature to create an enhanced e-mail message, and for e-mailing the enhanced e-mail message to the at least one recipient mail box. Preferably, the e-mail system web site further includes at least one mail box associated with at least one member, whereby the member may receive e-mail in the mail box.

FIGS. 4-11 illustrate a method and a system for providing an application program adapted to be incorporated as a "payload" of an electronic message. Such application program is automatically initialized after the electronic message is selected by a user. After initialization, the application program is executed. The execution of the application program includes various features.

For example, such execution may include displaying text included with the first electronic message, displaying indicia, allowing entry of text, and sending the entered text and the application program over a network in a second electronic message to a second user upon selection of the indicia. In one embodiment, a code segment may be executed which includes as a parameter at least a portion of the text included with the electronic message, thus incorporating the text with any type of functionality, i.e. graphic, etc. Still yet, other features may be included such as an advertisement that is displayed only after the electronic message is forwarded a predetermined number of instances. Also, the text included with the electronic message may constitute a hyperlink which, when selected, links to a site and enters the text as a parameter upon such linking.

As will become apparent, the personal text of the electronic message may induce the user to open the mail while the functionality may serve as an inducement to send the electronic message to another user. This in turn may be used to incur visits to a particular site on the network. In the alternative, it may serve to afford widespread exposure of advertisements or any other feature that supports e-Commerce.

Figure 4:
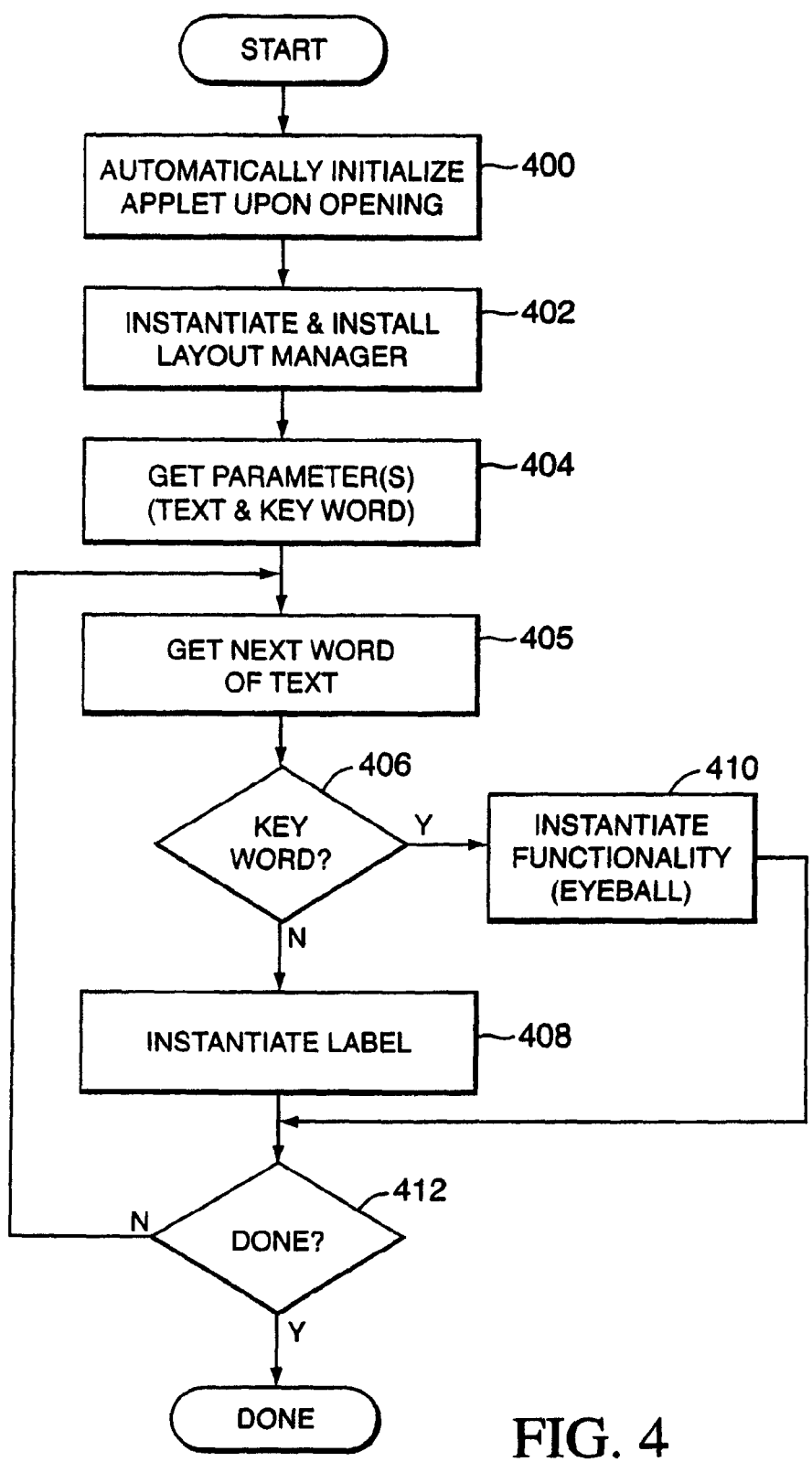
FIG. 4 is a flowchart illustrating the execution of the first application program of one embodiment of the present invention.

FIG. 4 is a flowchart illustrating the execution of the first application program associated with the first electronic message that is sent to a first user. The first electronic message may be received over any network such as a wide area network. In one embodiment, such wide area network may include the Internet and the first electronic message may be transmitted using a protocol such as TCP/IP and/or IPX. The first electronic message includes a first application program incorporated therein by any desired technique, along with a message, i.e. graphic, textual, audible, etc., generated by a previous user. In one embodiment, at least a portion of the first application program includes a JAVA APPLET. In the alternative, such first application program may include code segments written in any desired object-oriented computer programming or markup language.

As shown in operation 400 of FIG. 4, the first application program of the first electronic message is automatically initialized upon being selected, or "opened", by a user on an electronic mail browser, i.e. NETSCAPE COMMUNICATOR, MICROSOFT OUTLOOK, etc. Such selection may include "clicking" on an identifier of the first electronic message, or any other technique enabled by the electronic mail browser. Upon such user action, the first electronic message is initialized immediately in an automated manner. To accomplish this, the first application program may depart from an "attachment" in the traditional sense, and be included in the first electronic message itself. Further, the electronic mail browser must be capable of automatically recognizing and executing the computer or markup language employed by the application program, a common capability among electronic mail browsers.

Initialization of the first application program may include determining various variables and other parameters required to execute the application program, or any other "pre-execution" duties. For example, one of such parameters may comprise the body of text included with the first electronic message.

In one embodiment, hypertext markup language may be included with the first electronic message to contain the parameters and call another portion of the first application program such as a JAVA APPLET located at another site on the network. It should be noted, however, that the hypertext markup language itself or any other computer or markup language included with first electronic message may constitute a component or an entirety of the first application program. In other words, any desired portion (including no portion) of the first application program may be positioned at a separate location on the network.

Programs that execute the foregoing eyeball graphic feature are commonly known to those of ordinary skill. Such programs commonly use a tan(2) in order to compute the angle between the eyeball and the mouse cursor. An example of a code segment that executes the mouse listener feature, and that calls the eyeball graphic feature is as follows:

```
import java.applet.*;
import java.awt.*;
import java.lang.*;
import java.util.*;
import java.awt.event.*;
import java.net.*;
public class HelloAgainWorld extends Applet
{
  Image backBuffer;
  Graphics backG;
  String s = "null";
  public void init( )
  {
  //this.setLayout(null);
  this.setLayout(new FlowLayout(FlowLayout.LEFT));
  s= getParameter("info");
  StringTokenizer parser = new StringTokenizer(s);
  try
  {
  while(parser.hasMoreTokens( ))
  {
    String a = parser.nextToken( );
    if (a.equals("I"))
    {
    Eyeball2 eye = new Eyeball2(this);
    eye.setSize(30, 30);
    add(eye);
    Clicker click = new Clicker(this);
    eye.addMouseListener(click);
    }
    else
```

```
    {
  Label helloLabel = new Label( );
  helloLabel.setText(a);
  helloLabel.setForeground(new Color(170, 27, 140));
    add(helloLabel);
    }
   }
  }
 catch (NoSuchElementException e)
 {
 }
}
public void paint(Graphics g)
{
   maintain( );
   super.paint(backG);
    g.drawImage(backBuffer, 0, 0, null);
}
public void update(Graphics g)
{
   maintain( );
   super.update(backG);
    g.drawImage(backBuffer, 0, 0, null);
}
void maintain( )
{
    // Maintain the back buffer and the graphics context that is
directed towards the back buffer.
     {
     int w = getBounds( ).width;
     int h = getBounds( ).height;
     // If there is no buffer or it is the wrong width, or it is
the wrong height, then adjust the back buffer.
        if ( backBuffer == null || backBuffer.getWidth(null) != w ||
backBuffer.getHeight(null) != h )
         {
         // Adjust the back buffer.
         backBuffer = createImage( w, h );
         // If we have a backBuffer, then make a graphics context
that is directed towards the back buffer.
         if (backBuffer != null)
          {
// Dispose of any previous graphics context that may
          have pointed to a previous back buffer.
          if ( backG != null)
           {
           backG.dispose( );
           }
          // Now create the graphics context that is directed
to the back buffer.
          backG = backBuffer.getGraphics( );
         }
        }
       }
      }
     }
class Clicker implements MouseListener
{
 Applet a;
 URL url;
 Clicker(Applet_a)
  {
 a = _a;
 }
 public void mouseClicked(MouseEvent evt)
 {
 }
 public void mousePressed(MouseEvent evt)
 {
 }
 public void mouseReleased(MouseEvent evt)
 {
 AppletContext ac = a.getAppletContext( );
 try
  {
  url = new URL("http://207.82.252.253/cgi-
bin/linkrd?_lang=&hm_action=
http%3a%2f%2fwww%2eneostar%2ecom");
 }
```

```
 catch (MalformedURLException e)
  {
  System.out.println("I was a malformed url");
  }
 ac.showDocument(url);
 }
 public void mouseEntered(MouseEvent evt)
 {
 }
 public void mouseExited(MouseEvent evt)
 {
 }
}
```

It should be noted that any type of functionality may be incorporated during the execution of the first application program. For example, advertisements may be displayed, etc.

In operation 402 of FIG. 4, execution of the first application program has commenced and a layout manager is instantiated and installed. Layout managers are well known to those of ordinary skill in the art, and function to define the graphical framework during execution. Specifics regarding the graphical framework will be set forth in greater detail in the description of FIG. 5.

Thereafter, in operation 404, a particular key string parameter is retrieved in addition to the entire body of text. The key string parameter may include a particular string of text that is included in the body of text. In one embodiment, the word "I" may be retrieved as the key string parameter. In still other embodiments, any other letter, expression, word, phrase, pattern, format, etc. may be used as a key string parameter.

Next, each word and/or phrase of the body of text is retrieved in operation 405, and compared with the key string parameter to determine whether there is a match in decision 406. To accomplish this, a parser such as ANTLR may be employed to identify the designated letter, expression, word, phrase, pattern, format, etc. If it is determined that a match does not exist, a convention label is instantiated for simply displaying the current word and/or phrase in operation 408. On the other hand, if it is determined that a match does indeed exist, a functionality is instantiated which incorporates the key string parameter in operation 410. It is then determined in decision 412 whether all of the words and/or phrases of the body of text have been compared. If not, the process operations 405-410 are repeated.

Figure 5:
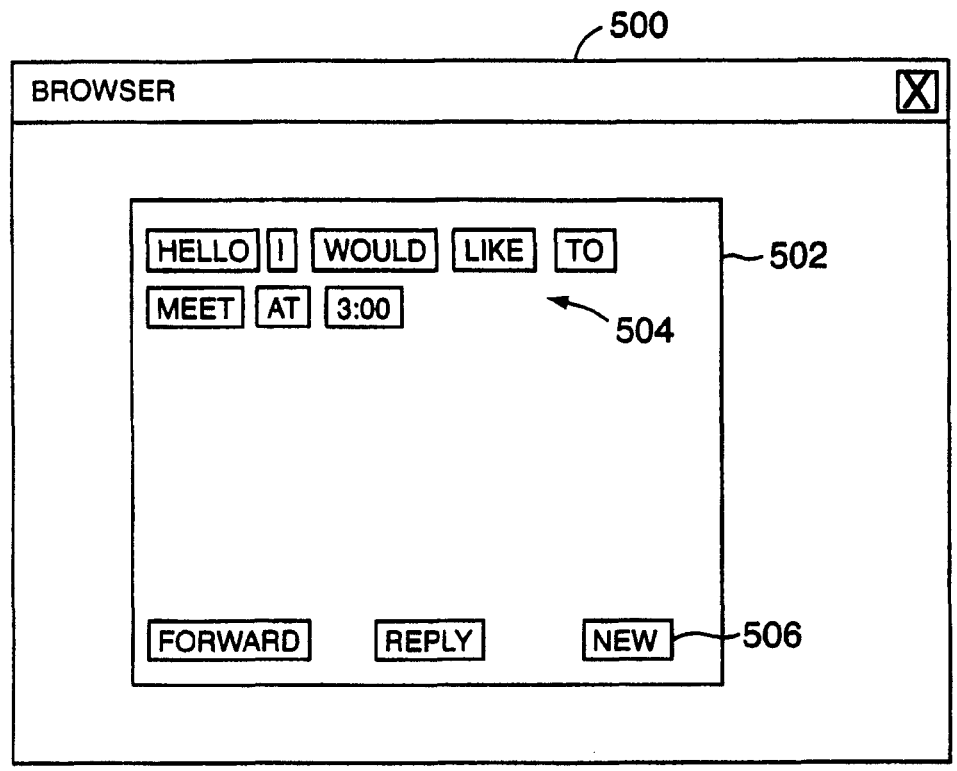
FIG. 5 is an illustration of a graphical user interface of the present invention that is displayed upon the execution of the first application program, and which is used to display the text of the first electronic message and any functionality associated therewith.

FIG. 5 is an illustration of a graphical user interface of the present invention that is displayed upon the execution of the first application program, and which is used to display the text of the first electronic message and any functionality associated therewith. As shown, a frame 500 of the network browser encompasses a text box 502. Such text box includes the body of text 504. Further, a plurality of first indicia 506 is displayed in or around the text box. In one embodiment, the first indicia may include a "FORWARD", "REPLY", and/or a "NEW" icon.

Figure 6:
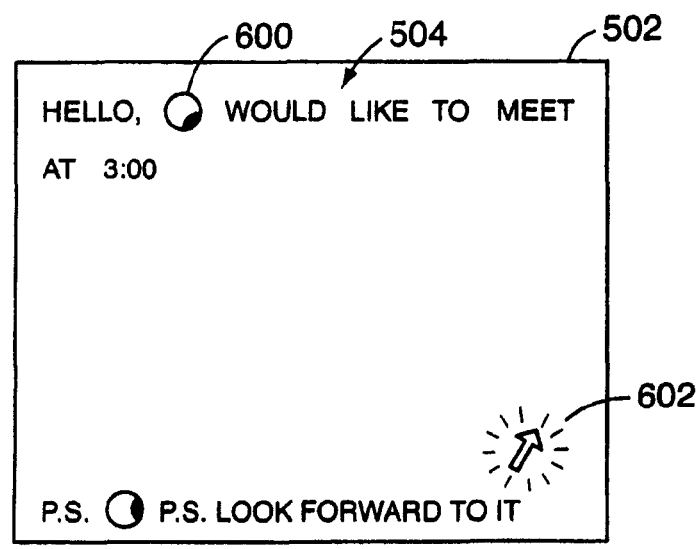
FIG. 6 illustrates one example of the functionality displayed upon execution of the first application program in accordance with one embodiment of the present invention.

FIG. 6 illustrates one example of the functionality displayed upon execution of the first application program. In such embodiment, the key string parameter is "I", and an eyeball 600 is graphically depicted in place of the key string parameter within the textbox 502. During use, the movement of the eyeball 600 may be adapted to coincide with the movement of a mouse cursor 602. This may be accomplished using a "mouse listener" which may interface with the first application program. Mouse listeners track a current position of mouse cursors. It should be noted that in various alternate embodiments, any type of user input may be used to change various aspects, i.e. graphic, textual, layout, color, sound, etc. of the first electronic message.

Figure 7:
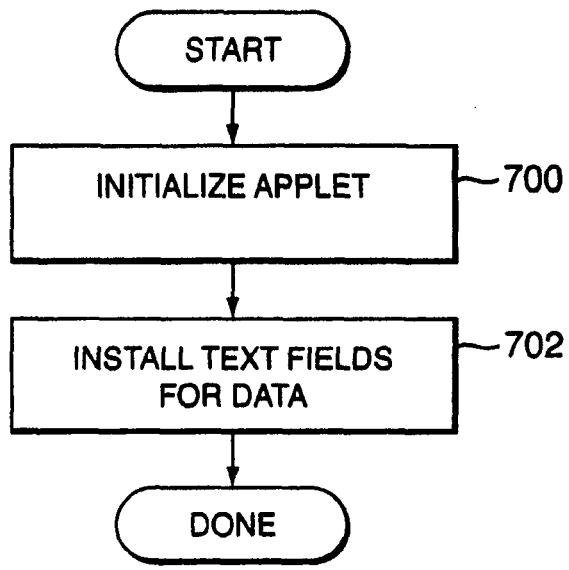
FIG. 7 illustrates the execution of the second application program of the present invention which is initiated upon the selection of one of the "FORWARD", "REPLY", or "NEW" icons displayed in the graphical user interface of FIG. 5.

FIG. 7 illustrates the execution of the second application program of the present invention which is initiated upon the selection of one of the first indicia 506, i.e. the "FORWARD", "REPLY", and/or "NEW" icon, displayed in the graphical user interface of FIG. 5. In particular, it will be assumed in the present description that the "NEW" icon has been selected. It should be noted, however, that given the present description it would be well within the ability of one of ordinary skill to implement the "FORWARD" and "REPLY" functions. With respect to the "REPLY" icon, there may be a need for a mechanism of transferring the body of text from the first application program to the second application program. This may be accomplished by a "cookie" or similar metadata-type information.

As shown in FIG. 7, a second application program is initialized upon the selection of the first indicia 506 in operation 700. It should be noted that, in one embodiment, the second application program may be a component of the first application program thus rendering a single application program. In one embodiment, the first application program includes an un-signed application program and the second application program includes a signed application program.

Similar to the first application program, initialization of the second application program may include determining various variables, and other parameters required to execute the application program. Next, in operation 702, text fields are installed for allowing entry of text by the first user.

Figure 8:
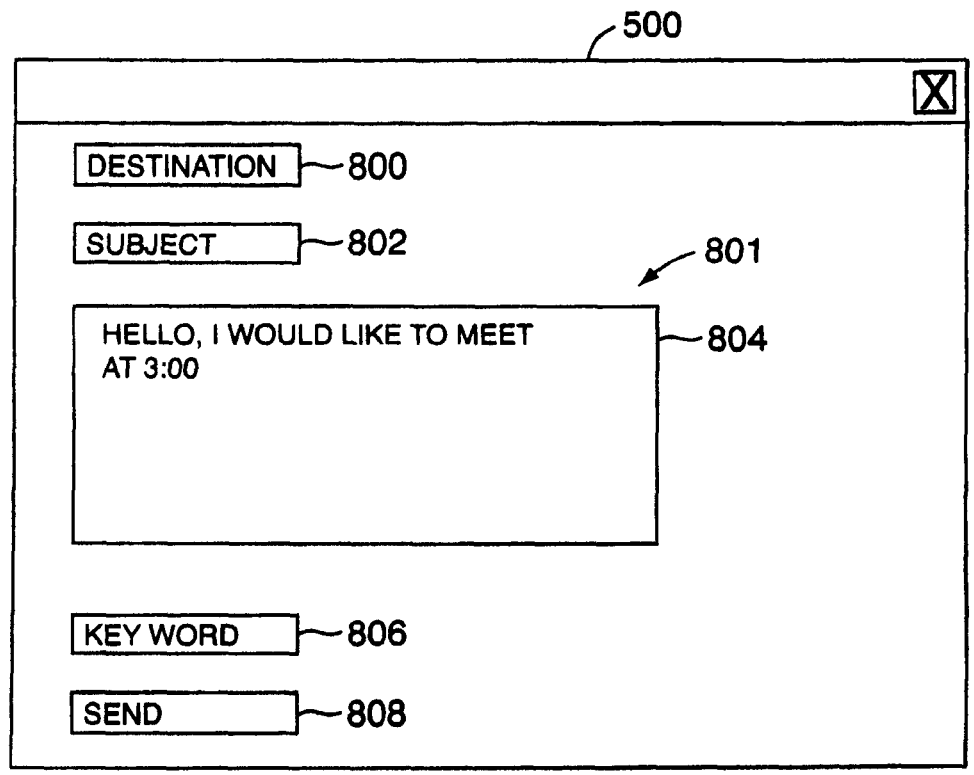
FIG. 8 is an illustration of a graphical user interface associated with the execution of the second application program in accordance with one embodiment of the present invention.

FIG. 8 is an illustration of a graphical user interface associated with the execution of the second application program. As shown, a plurality of text fields 801 are displayed within the frame 500 of the network browser. Included are a destination text box 800 for allowing the insertion of an electronic mail address of a desired destination, a subject text box 802 for allowing entry of a subject of a message, a body text box 804 for allowing entry of a body of text or message, and a key word text box 806 which is adapted for allowing entry of the key string parameter. Also included is second indicia 808 which may take the form of a "SEND" icon or the like.

Figures 9, 10:
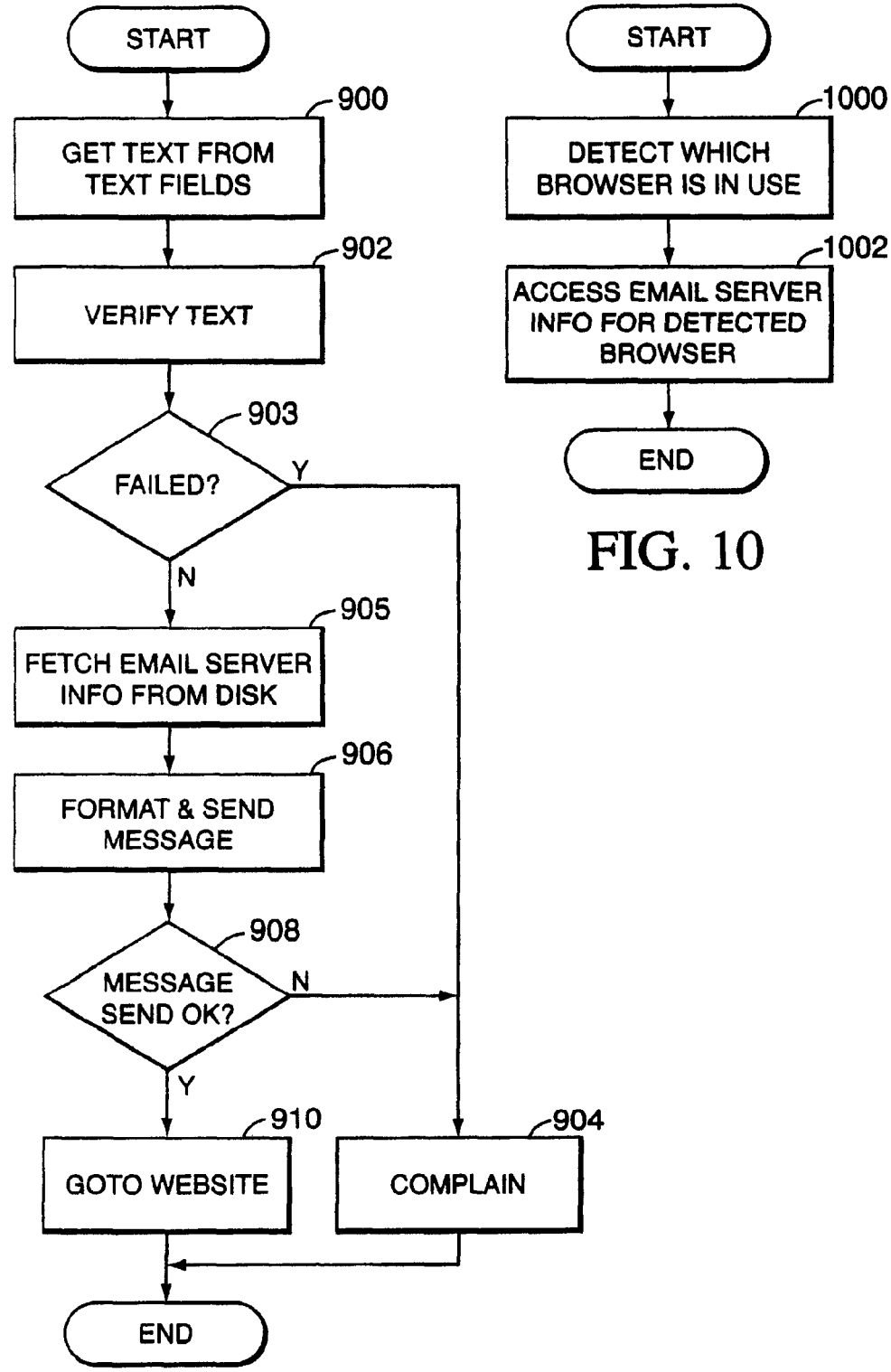
FIG. 9 is a flowchart illustrating the continued execution of the second application program upon the selection of the "SEND" or other similar icon on the graphical user interface of FIG. 8.
FIG. 10 is a flowchart illustrating the operations associated with the fetch e-mail operation of FIG. 9.

FIG. 9 is a flowchart illustrating the continued execution of the second application program upon the selection of the second indicia 808, i.e. "SEND", on the graphical user interface of FIG. 8. As shown, in operation 900, the text is first retrieved from the text fields 801 of the graphical user interface of FIG. 8. Next, in operation 902, the text is verified to ensure that each of the necessary text fields are filled and valid. For example, the text boxes 800 and 804 may be required.

If it is determined by decision 903 that the verification of operation 902 fails, a complaint is issued in operation 904. Such complaint may take the form of a pop-up window or the like, and may describe the nature of any defects. On the other hand, if the verification of operation 902 succeeds and all of the necessary fields are filled, information associated with an electronic mail server of the first user is retrieved in operation 905. This may be accomplished by accessing a hard drive of a computer of the first user which is running the network browser and electronic mail browser. The purpose of obtaining this information is to identify a server from which the information in the text fields 801 may be sent in the form of a second message. In the alternative, a single designated server may be automatically identified by the second application program, thus obviating the need to access the hard drive of the computer of the first user.

Upon identifying a server from which the second message is to be sent, the second electronic message may be formatted and sent to a second user in operation 906. Upon being sent, another verification may be executed in decision 908 in order to ensure that the second electronic message was sent in a satisfactory manner. If successful transmittal of the message is not verified, a complaint may be issued in a manner similar to that discussed hereinabove with respect to operation 904.

If, on the other hand, successful transmittal of the message is verified in decision 908, the second application program may optionally link the first user to a site on the network in operation 910. Such site may be identified by the second application program. This feature may thus be used to increase a number of visits, or "hits", on a particular site which in itself may warrant substantial consideration.

FIG. 10 is a flowchart illustrating the operations associated with the fetch e-mail operation 905 of FIG. 9. As mentioned earlier, this may be accomplished by accessing a hard drive of a computer of the first user which is running the network browser and electronic mail browser. Before this may be effected, in operation 1000, the browser(s) that is currently in use may be detected after which the appropriate information may be accessed in operation 1002. As an option, permission to retrieve such information may be gained from the first user prior to any action being taken.

Figure 11:
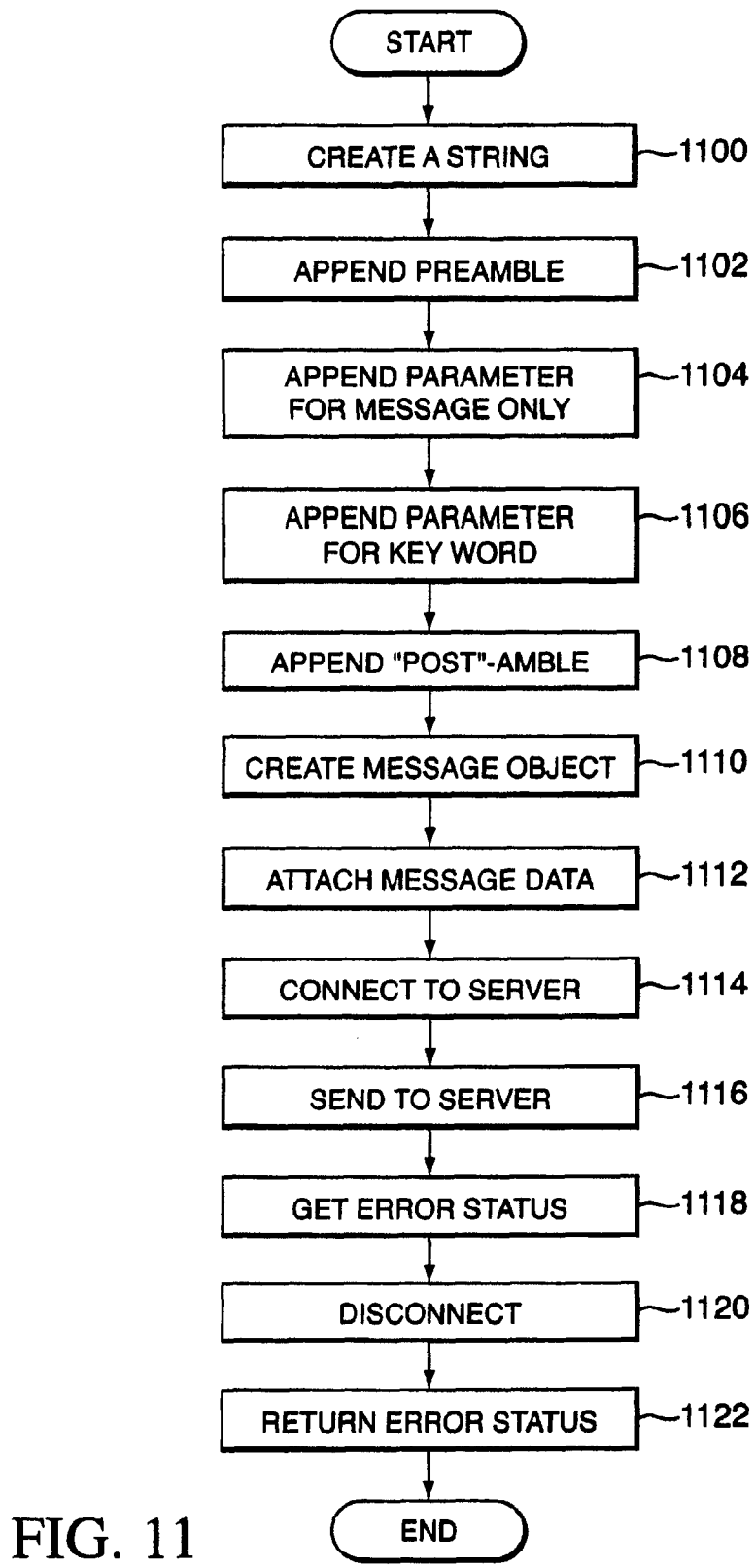
FIG. 11 is a flowchart illustrating the operations associated with the format and send message operation of FIG. 9.

FIG. 11 is a flowchart illustrating the operations associated with the format and send message operation 906 of FIG. 9. The format refers to the hypertext mark-up language of which an example was provided earlier. In order to generate such format, a string is first created in operation 1100. Thereafter, a preamble is appended to the string in operation 1102. Thereafter, the body of text and key string parameters are appended in operations 1104 and 1106 after which a postscript is appended in operation 1108. An example of each of the foregoing appended elements are outlined as follows using the example set forth earlier:

---

Preamble
    <HTML>
    <HEAD>
    <TITLE>Practice Applets</TITLE>
    </HEAD>
    <BODY>
    <APPLET CODEBASE="http://esprinkles.com" (*1$^{st}$ app. program*)
    CODE="HelloAgainWorld.class" ARCHIVE=
    "eyejar.jar" WIDTH=1000 HEIGHT=1000
    ALIGN=left>
        (i)    Parameter
    <PARAM NAME=info VALUE="...body of text...">
        (ii)
        (iii)
        (iv)    Parameter
    <PARAM NAME=keystring VALUE="I">
    Note: multiple key strings and adaptive keys may be used to identify the letter, expression, word, phrase, pattern, format, etc.
Postscript
    </APPLET>
    </BODY>
    </HTML>

---

With continuing reference to FIG. 11, a message object is then created in operation 1110. Thereafter, the string and appendages, or message data, is attached to the object in operation 1112 using the JAVA mail API. Using the information collected about the server, a connection is then effected with the desired host server in operation 1114 after which the message object and data are sent in operation 1116. In the case of multiple electronic mail destinations, this operation may be repeated as many times as required.

An error status is then retrieved in operation 1118 to enable the decision 908 of FIG. 9. Next, the server is disconnected in operation 1120 and the error status is returned in operation 1122.

One example of functionality that may be implemented by the first application program was shown in FIG. 6. It should be noted, however, that any type of functionality may be employed by running a code segment including as a parameter at least a portion of the text included with the electronic message.

In various embodiments, the functionality may include the incorporation of an image, video, a specific graphic feature, or any other type of object for that matter. For example, any type of theme such as rabbits, earthquakes, popular icons and trademarks may be employed during the display of the text associated with the electronic message. As an option, such graphics may in some way interact with the text of the electronic message.

For example, where the theme is earthquakes, the text may be shown to shutter or the like. Or, where the theme is rabbits, the rabbits may be shown hopping from word to word. Still yet another example includes dressing or undressing an icon in various attire or providing any other type of feedback based on user input. As an option, the selection of the graphic or icon may initiate a link to a predetermine site on the network. Still yet, the application program may be adapted to allow the object to be substituted with any of the strings of the text while it is being shown. This may be accomplished with a select and "drag" feature.

In another embodiment, the execution of the first application program may include linking a string of the text of the first electronic message with a site on the network. In other words, such string constitutes a hyperlink. In such embodiment, the execution of the first application program may further include automatically inputting the string as a parameter to the site on the network upon selection of the hyperlink for various purposes. In the case where the site is a search engine, the string may be automatically entered as a search term in the search engine upon the selection of the hyperlink, thus prompting immediate reaction by the search engine. One example of an implementation of this concept is as follows:

http://www.search_engine.com/?MT=keystring&SM=MC&DV=0&LG=any&DC=10&DE=2&_v=2&OPs=MDRTP In still another embodiment, the functionality associated with the electronic messages provides an inducement for sending them to additional users. With this exposure, the present invention may be used to propagate advertisements over the network. First, the electronic message is provided with the application program attached thereto which is capable of displaying an advertisement. As the message is communicated over the network, each instance of such communication is detected.

As such, the number of the instances that the electronic message is communicated over the network may be traced. The advertisement is then displayed after a predetermined number of the instances greater than one has been tracked. By employing this technique, the users will not be thwarted from forwarding the electronic message until after a predetermined geometric propagation has already taken place. It should be noted that the foregoing tracking ability may also be used to base a determination of compensation from the advertiser.

As an option, the predetermined number may be based on a Fibonacci sequence for optimized perpetuance of the electronic message. Further, the predetermined number may be based on a generation of the electronic message. As an option, the advertisement may be displayed by automatically linking to a site on the network.

The forgoing descriptions provide a basic framework for understanding many of the advantageous features of the present invention. It will be appreciated that the technology has many applications. Some of the applications will be discussed below by way of example, not limitation.

Figure 12:
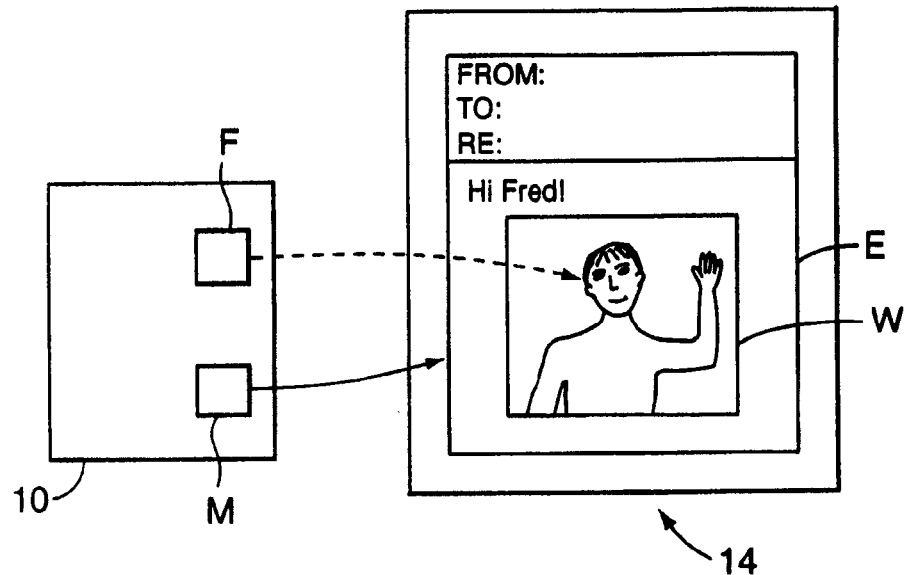
FIG. 12 is an example of audio and/or visual content being e-mailed to a recipient according to the present invention.

In FIG. 12, audio and/or visual content can be "e-mailed" to one or more recipients. There are several ways of implementing this feature, as will be appreciated by those skilled in the art. A preferred method is for a member to provide an audio and/or e-mail message which is stored on server 10 as a file F. In addition, a text message can be stored as a file M. The web site then creates an e-mail message E which is displayed on a recipient's machine 14 that includes (for visual messages) a window W for the display of video information (VideoMail). This video information can be a part of the e-mail message, or it can be streamed from the server 10 over the network, as will be appreciated by those skilled in the art.

Figure 13:
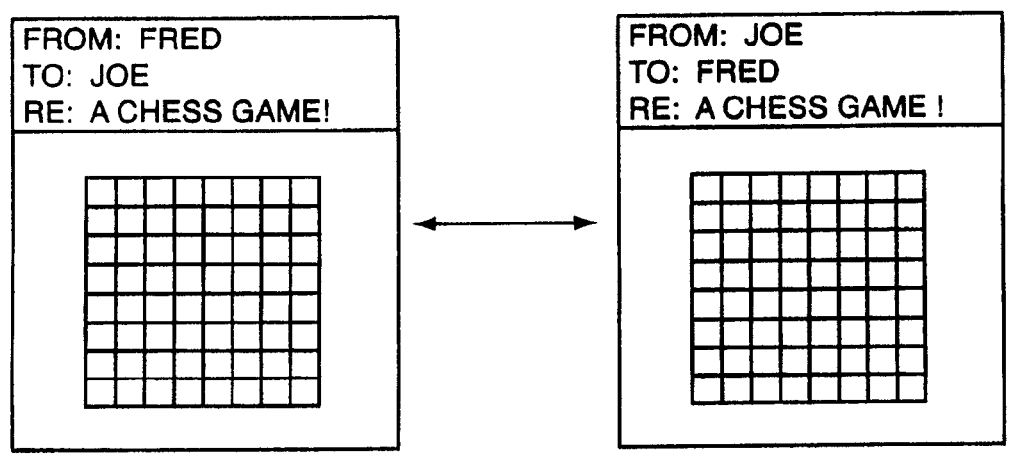
FIG. 13 is an example of an interactive game being e-mailed between two recipients according to the present invention.

In FIG. 13, an enhanced e-mail of the present invention is being e-mailed back and forth between two recipients. In this case, the e-mail includes an interactive game of chess. A first recipient makes a first move on the chess-board, such as with his pointing device, and then e-mails it to a second recipient. The second recipient then makes a second move, and e-mails it back to the first recipient, and so forth. The enhanced e-mail therefore implements a chess game program which remembers positions, enforces rules, etc. It is therefore apparent that the enhanced e-mail is capable of interacting with one or more recipients, and of increasing and modifying its store of data. It should be noted that video cameras, or "micro-cameras", that are commonly mounted on computers may be used to facilitate such interaction. Use of such cameras is becoming more and more of a standard feature.

Figure 14:
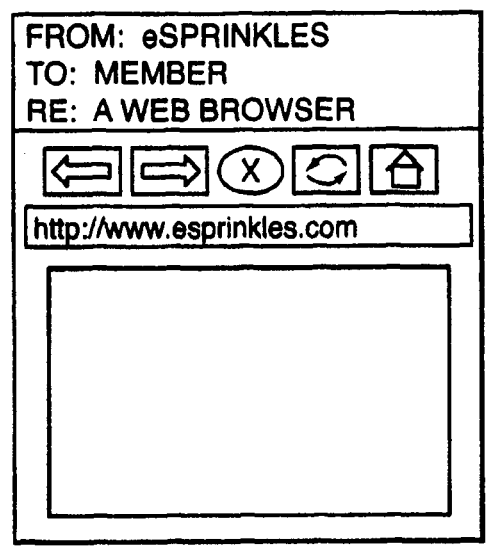
FIG. 14 is an example of a web browser being e-mailed to a recipient according to the present invention.

In FIG. 14, an enhanced e-mail includes a self-executing program which implements a web browser within the e-mail message. The recipient can then browse the Internet with the web browser as he or she would with other web browsers. The URL of the web browser can initially direct the web browser to an advertiser's web site. Certain controls can be disabled such that the web browser can visit only one or a limited number of web sites.

Figure 15:
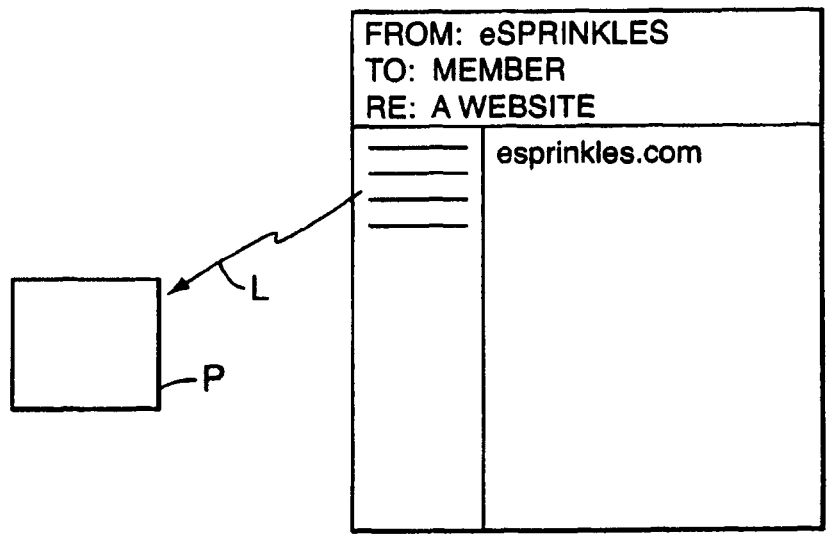
FIG. 15 is an example of at least a portion of a website being e-mailed ("pushed") to a recipient according to the present invention.

In FIG. 15, an enhanced e-mail includes at least a part of a web site that has been e-mailed or "pushed" to a recipient. There is no reason, other than size, why an entire web site cannot be pushed onto a recipient's machine by an enhanced e-mail of the present invention. However, more preferably, certain pages of a web site may by incorporated into the enhanced e-mail message, such that links such as the link L can form hypertext links to web pages, such as web page P, stored elsewhere on the Internet.

While this invention has been described in terms of several preferred embodiments, it is contemplated that alternatives, modifications, permutations and equivalents thereof will become apparent to those skilled in the art upon a reading of the specification and study of the drawings. It is therefore intended that the following appended claims include all such alternatives, modifications, permutations and equivalents as fall within the true spirit and scope of the present invention.

What is claimed is:

1. A computer program embodied on non-transitory computer-readable media, the program comprising instructions for execution by one or more processors of an electronic device with a display, comprising:
   software segments for creating an e-mail having a discretionary functionality including an image within a body portion of said e-mail, a set of rules governing interaction with said image, and a store of data, said image including at least portions with which a recipient at a recipient computer system may interact, subject to the enforcement of said set of rules by the recipient computer system, to at least one of increase and modify said store of data; and
   software segments for sending said e-mail to said recipient;
   wherein said image is an image of a game, said game comprises chess, said set of rules comprise rules of said game, and said store of data comprises a state of said game;
   wherein said e-mail is first sent by an original sender and further comprising software segments for receiving said e-mail by said original sender after said store of data has been at least one of increased and modified by the recipient of the e-mail.

2. The computer program embodied on non-transitory computer-readable media as recited in claim 1, wherein said store of data is configured to accumulate inputs from a plurality of recipients.

3. The computer program embodied on non-transitory computer-readable media as recited in claim 1, wherein said store of data further accumulates at least one input from said original sender of said e-mail.

4. The computer program embodied on non-transitory computer-readable media as recited in claim 1, wherein said discretionary functionality includes a self-executing application that is automatically initialized when said e-mail is opened by a user.

5. The computer program embodied on non-transitory computer-readable media as recited in claim 1, wherein said e-mail is sent back and forth between said original sender and one or more recipients a plurality of times.

6. The computer program embodied on non-transitory computer-readable media as recited in claim 1, wherein said image comprises at least one data entry field, said set of rules comprise rules enforcing a proper entry of data into said data entry field, and said store of data comprises data entered into said data entry field.

* * * * *